(12) United States Patent
Heckmeier et al.

(10) Patent No.: US 7,153,550 B2
(45) Date of Patent: Dec. 26, 2006

(54) LIQUID CRYSTALLINE MEDIUM AND LIQUID CRYSTAL DISPLAY

(75) Inventors: Michael Heckmeier, Hemsbach (DE); Sabine Schoen, Herten (DE); Peer Kirsch, Seeheim-Jugenheim (DE); Matthias Bremer, Darmstadt (DE); Volker Reiffenrath, Rossdorf (DE)

(73) Assignee: Merck Patent Gesellschaft, Darmstadt (DE)

( * ) Notice: Subject to any disclaimer, the term of this patent is extended or adjusted under 35 U.S.C. 154(b) by 0 days.

(21) Appl. No.: 10/503,476

(22) PCT Filed: Jan. 7, 2003

(86) PCT No.: PCT/EP03/00043

§ 371 (c)(1),
(2), (4) Date: Aug. 4, 2004

(87) PCT Pub. No.: WO03/066774

PCT Pub. Date: Aug. 14, 2003

(65) Prior Publication Data

US 2005/0092966 A1    May 5, 2005

(30) Foreign Application Priority Data

Feb. 5, 2002   (EP) ................... 02002653
Apr. 15, 2002  (EP) ................... 02008162

(51) Int. Cl.
*C09K 19/30* (2006.01)
*C09K 19/12* (2006.01)
*C09K 19/20* (2006.01)

(52) U.S. Cl. ............. 428/1.3; 252/299.63; 252/299.66; 252/299.67

(58) Field of Classification Search ................ 428/1.1, 428/1.3; 252/299.01, 299.61, 299.63, 299.66, 252/299.67
See application file for complete search history.

(56) References Cited

U.S. PATENT DOCUMENTS

| 5,376,302 A | 12/1994 | Coates et al. |
| 5,397,505 A | 3/1995 | Rieger et al. |
| 6,180,026 B1 | 1/2001 | Rieger et al. |
| 6,465,059 B1 * | 10/2002 | Bremer et al. ............... 428/1.1 |
| 6,565,933 B1 * | 5/2003 | Tarumi et al. ............... 428/1.1 |
| 6,596,350 B1 * | 7/2003 | Tarumi et al. ............... 428/1.1 |
| 6,669,998 B1 * | 12/2003 | Tarumi et al. ............... 428/1.1 |
| 6,685,996 B1 * | 2/2004 | Tarumi et al. ............... 428/1.1 |
| 6,761,939 B1 * | 7/2004 | Manabe et al. ............... 428/1.1 |
| 6,929,833 B1 * | 8/2005 | Tarumi et al. ............... 428/1.1 |
| 6,953,610 B1 * | 10/2005 | Heckmeier et al. .......... 428/1.1 |
| 7,026,020 B1 * | 4/2006 | Heckmeier et al. .......... 428/1.1 |
| 7,033,654 B1 * | 4/2006 | Heckmeier et al. .......... 428/1.1 |
| 2002/0038859 A1 | 4/2002 | Heckmeier et al. |
| 2003/0134056 A1 * | 7/2003 | Heckmeier et al. .......... 428/1.1 |
| 2003/0197153 A1 * | 10/2003 | Heckmeier et al. .... 252/299.61 |

FOREIGN PATENT DOCUMENTS

| DE | 4101468 | * | 7/1991 |
| DE | 4442517 |   | 6/1995 |
| DE | 19961702 | * | 6/2001 |
| EP | 0540044 |   | 5/1993 |
| GB | 2284614 | * | 6/1995 |
| WO | WO 9111497 |   | 8/1991 |
| WO | WO 9206148 |   | 4/1992 |
| WO | WO 0146336 |   | 6/2001 |
| WO | WO 0179379 |   | 10/2001 |

* cited by examiner

*Primary Examiner*—Shean C. Wu
(74) *Attorney, Agent, or Firm*—Millen, White, Zelano & Branigan, P.C.

(57) ABSTRACT

The instant invention relates to liquid crystalline media comprising a dielectrically positive component, component A, consisting of dielectrically positive compounds, comprising one or more compounds of formula I and one or more compounds of formula II

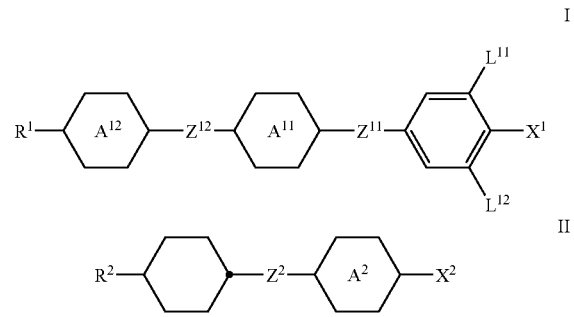

wherein the parameters have the meaning given in the specification and to liquid crystal displays comprising these media, especially to active matrix displays.

19 Claims, No Drawings

LIQUID CRYSTALLINE MEDIUM AND LIQUID CRYSTAL DISPLAY

FIELD OF THE INVENTION

The present invention relates to liquid crystalline media and to liquid crystal displays comprising these media, especially to displays addressed by an active matrix and in particular to displays of the TN-type.

PROBLEM TO BE SOLVED AND STATE OF THE ART

Liquid Crystal Displays (LCDs) are widely used to display information. Electro-optical modes employed are e.g. the twisted nematic (TN)-, the super twisted nematic (STN)-, the optically compensated bend (OCB)- and the electrically controlled birefringence (ECB)-mode with their various modifications, as well as others. Besides these modes, which all do use an electrical field, which is substantially perpendicular to the substrates, respectively to the liquid crystal layer, there are also electro-optical modes employing an electrical field substantially parallel to the substrates, respectively the liquid crystal layer, like e.g. the In-Plane Switching mode (as disclosed e.g. in DE 40 00 451 and EP 0 588 568). Especially this electro-optical mode is used for LCDs for modern desk-top monitors.

The liquid crystals according to the present invention are preferably used in TN-AM displays.

For these displays new liquid crystalline media with improved properties are required. Especially the birefringence ($\Delta n$) should be sufficiently high. Further, the dielectric anisotropy ($\Delta\varepsilon$) should be high enough to allow a reasonably low operation voltage. Preferably $\Delta\varepsilon$ should be higher than 7 and very preferably be higher than 9 or even higher than 10 but preferably not higher than 19 and in particular not higher than 15. Otherwise the resistivity of the mixtures tends to become unacceptably low for most TN-AMDs, leading to a poor voltage holding ratio. Besides this parameter, the media have to exhibit a suitably wide range of the nematic phase, a rather small rotational viscosity and, as mentioned above, an at least a moderately high specific resistivity.

The displays according to the present invention are preferably addressed by an active matrix (active matrix LCDs, short AMDs), preferably by a matrix of thin film transistors (TFTs). However, the inventive liquid crystals can also beneficiously be used in displays with other known addressing means.

There are various different display modes using composite systems of liquid crystal materials of low molecular weight together with polymeric materials such as e.g. polymer dispersed liquid crystal (PDLC)-, nematic curvilinearily aligned phase (NCAP)- and polymer network (PN)-systems, as disclosed for example in WO 91/05 029 or axially symmetric microdomain (ASM) systems and others. In contrast to these, the modes especially preferred according to the instant invention are using the liquid crystal medium as such, oriented on surfaces. These surfaces typically are pre-treated to achieve uniform alignment of the liquid crystal material The display modes according to the instant invention preferably use an electrical field substantially parallel to the composite layer.

LCDs are used for direct view displays, as well as for projection type displays.

Liquid crystal compositions with a suitable value of the birefringence for LCDs and especially for AMD displays are well known. Examples of technically advanced compositions for such applications containing compounds of the formulae

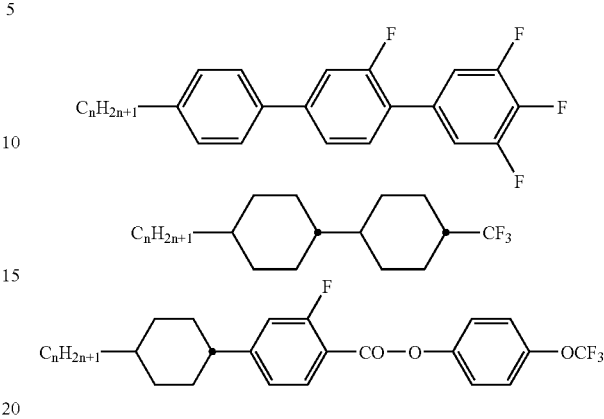

are known e.g. from WO 01/79 379. These compositions, however, do have significant drawbacks. Most of them have, amongst other deficiencies, too high values of the birefringence and especially a rotational viscosity, which is too high and lead to unfavourably long response times.

Thus, there is a significant need for liquid crystalline media with suitable properties for practical applications such as a wide nematic phase range, appropriate optical anisotropy $\Delta n$, according to the display mode used, an appropriately high $\Delta\varepsilon$, a sufficiently high resistivity and, in particular, a low rotational viscosity.

PRESENT INVENTION

Surprisingly, it now has been found that liquid crystalline media with a suitably high $\Delta\varepsilon$, a suitable phase range, and $\Delta n$ can be realised, which do not exhibit the drawbacks of the materials of the prior art, i.e. which have a significantly lower rotational viscosity compared to media of the state of the art having the same clearing point. Thus they allow to realise displays with significantly reduced response times.

These improved liquid crystalline media according to the instant application are comprising at least the following components:

a dielectrically positive component, component A, consisting of dielectrically positive compounds, preferably comprising one or more compounds of formula I

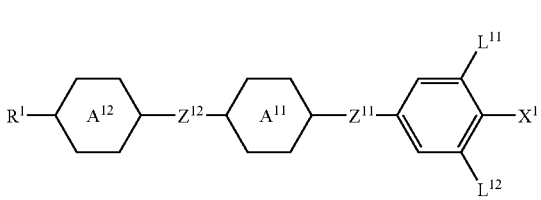

wherein
  $R^1$ is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,
  $X^1$ is F, Cl or fluorinated alkyl or fluorinated alkoxy, each with 1 to 4 C-atoms, preferably F or Cl, most preferably F and

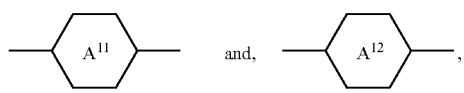 independently of each other, are

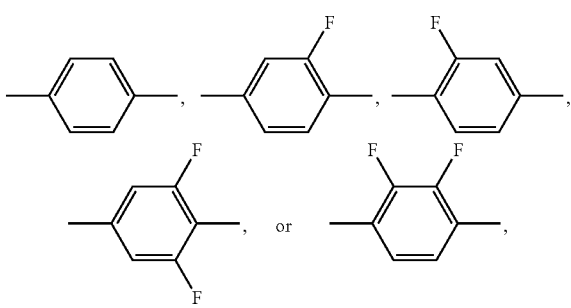

preferably

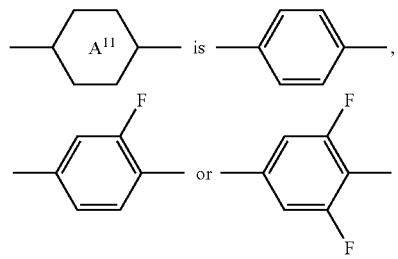

and preferably

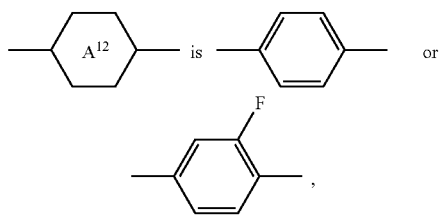

$Z^{11}$ and $Z^{12}$ are, independently of each other, —CH$_2$—CH$_2$—, —CF$_2$—CF$_2$—, —CF$_2$—O—, —O—CF$_2$—, —CH$_2$—O—, —O—CH$_2$—, —CO—O—, —CH=CH—, —CF=CF—, —CF=CH—, —CH=CF—, —C≡C— or a single bond, preferably both are a single bond,
$L^{11}$ and $L^{12}$ are, independently of each other, H or F, preferably $L^{11}$ is F and most preferably $L^{11}$ and $L^{12}$ both are F,
one or more compounds of formula II

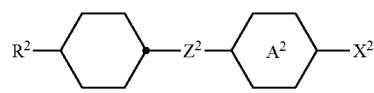

wherein
R² is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms, preferably alkyl or alkenyl,

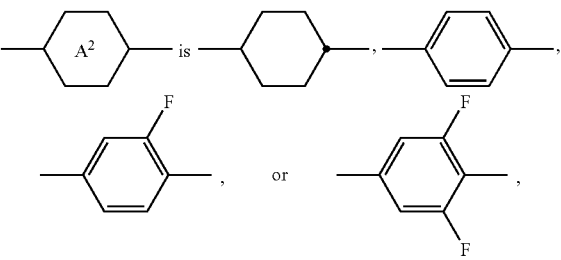

preferably

$Z^2$ is —CH$_2$—CH$_2$—, —CF$_2$—CF$_2$—, —CF$_2$—O—, —O—CF$_2$—, —CH$_2$—O—, —O—CH$_2$—, —CO—O— or a single bond, preferably a single bond and
$X^2$ is F, Cl or fluorinated alkyl or fluorinated alkoxy each with 1 to 4 C-atoms, preferably F, OCF$_3$ or CF$_3$,
optionally one or more compounds, preferably selected from the group of compounds of formulae of formula III and IV

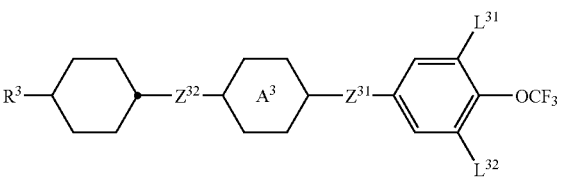

wherein
R³ is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms, preferably alkyl or alkenyl,

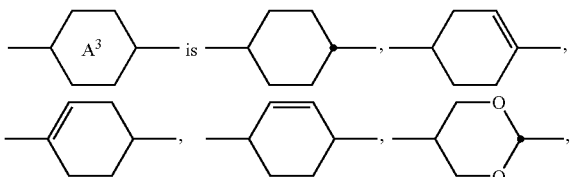

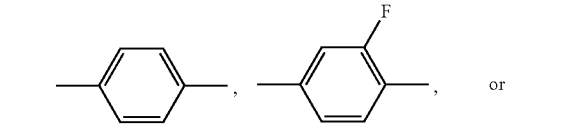

-continued

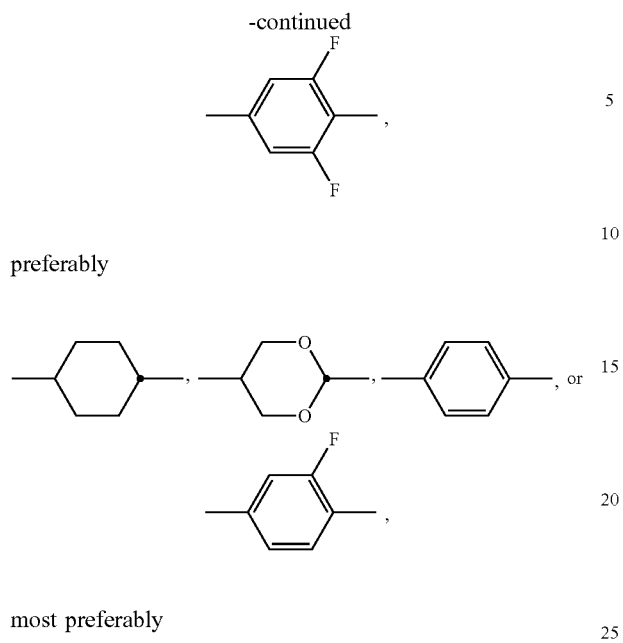

preferably most preferably

Z³¹ and Z³² are, independently of each other, —CH₂—CH₂—, —CF₂—CF₂—, —CF₂—O—, —O—CF₂—, —CH₂—O—, —O—CH₂—, —CO—O— or a single bond, preferably one of Z³¹ and Z³² is —CO—O— and the other is a single bond, most preferably Z³¹ is —CO—O— and Z³² is a single bond, L³¹ and L³² are, independently of each other, H or F, preferably L³¹ is H and most preferably L³¹ and L³² both are H,

IV

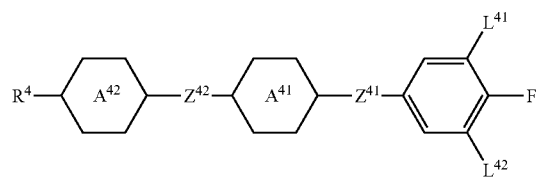

wherein
R⁴ is alkyl alkoxy, fluorinated alkyl or fluorinated alkoxy with 1 to 7 C-atoms, or alkenyl, alkenyloxy, alkoxyalkyl or fluorinated alkenyl with 2 to 7 C-atoms,

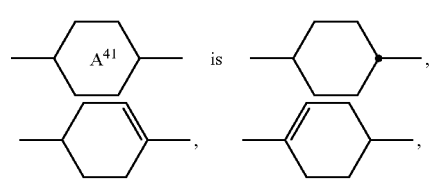

-continued

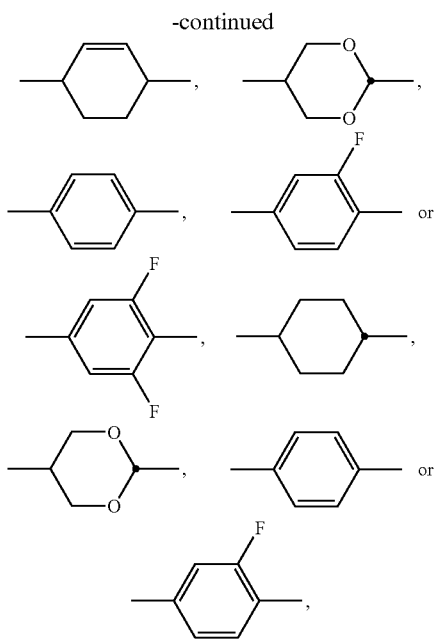

most preferably

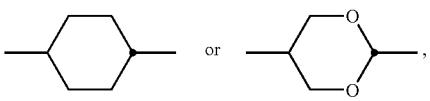

preferably most preferably

Z⁴¹ and Z⁴² are, independently of each other, —CH₂—CH₂—, —CF₂—CF₂—, —CF₂—O—, —O—CF₂—, —CH₂—O—, —O—CH₂—, —CO—O— or a single bond, preferably —CO—O— or a single bond, $L^{41}$ and $L^{42}$ are, independently of each other, H or F, preferably $L^{41}$ is F and most preferably $L^{41}$ and $L^{42}$ both are F, and optionally further dielectrically positive compounds, optionally, preferably obligatorily, a dielectrically neutral component, component B, consisting of dielectrically positive compounds, preferably comprising one or more compounds of formula V

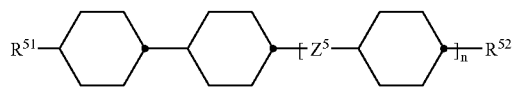

wherein $R^{51}$ and $R^{52}$, independently of each other, are alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms, preferably alkyl or alkenyl, $Z^5$ is —$CH_2$—$CH_2$—, —$CF_2$—$CF_2$—, —$CF_2$—O—, —O—$CF_2$—, —$CH_2$—O—, —O—$CH_2$—, —CO—O—, —CH=CH—, CF=CF—, —CF=CH—, —CH=CF— or a single bond, preferably —$CF_2$—O— or —$CH_2$—O—, most preferably —$CF_2$—O—, and n is 0 or 1, and optionally a dielectrically negative component, component C, consisting of dielectrically negative compounds.

Preferred are liquid crystal compositions comprising in component A one or more compounds selected from the group of formulae I-1 to I-5

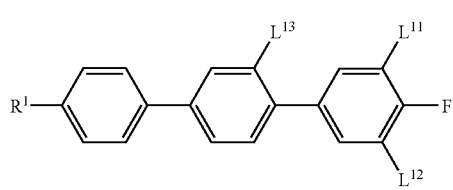

I-1

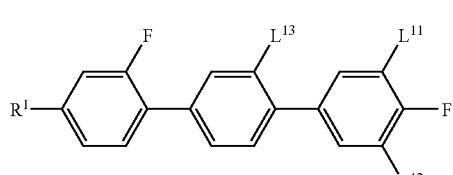

I-2

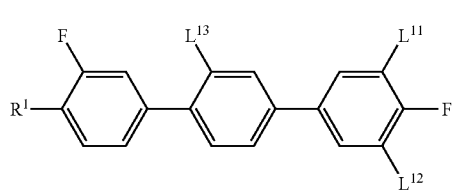

I-3

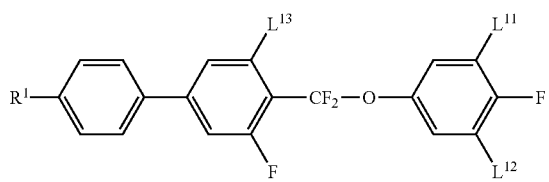

I-4

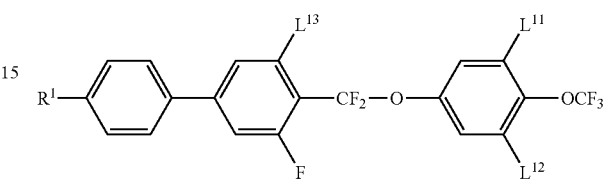

I-5 wherein $R^1$, $L^{11}$ and $L^{12}$ have the respective meanings given under formula I above and $L^{13}$, independently of the other parameters, has the meaning given for $L^{11}$ under formula I above, preferably $R^1$ is n-alkyl with 1 to 7, preferably with 1 to 5 C-atoms, $L^{11}$, $L^{12}$ and $L^{13}$ are, independently of each other, H or F, generally preferably at least one of $L^{11}$ to $L^{13}$ is F, most preferably at least one of $L^{11}$ and $L^{13}$, most preferably at least two of $L^{11}$ to $L^{13}$ are F.

Especially preferred are liquid crystal compositions comprising compounds of formula I-1 wherein $L^{11}$, $L^{12}$ and $L^{13}$ are all F and/or compounds of formula I-2 wherein $L^{11}$ and $L^{12}$ are, independently of each other, H or F and $L^{13}$ is F and/or compounds of formula I-3 wherein $L^{11}$ and $L^{12}$ are H or F, preferably H and $L^{13}$ is F and/or compounds of formula I-4 and/or formula I-5 wherein $L^{11}$ and $L^{12}$ are F and preferably $L^{13}$ is F.

Especially preferred the compounds of formulae I-1 to I-3 are selected from the respective groups I-1a to I-1d, I-2a to I-2e, I-3a to I-3f, I4a to I4d and I5a to I5d

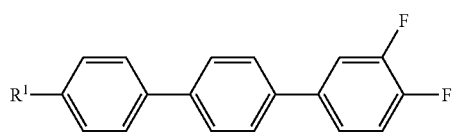

I-1a

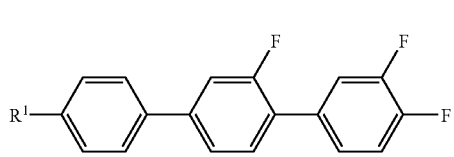

I-1b

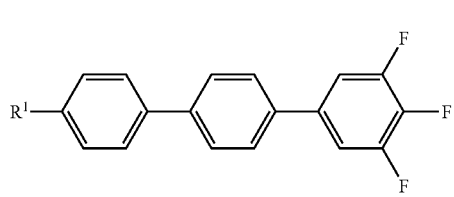

I-1c

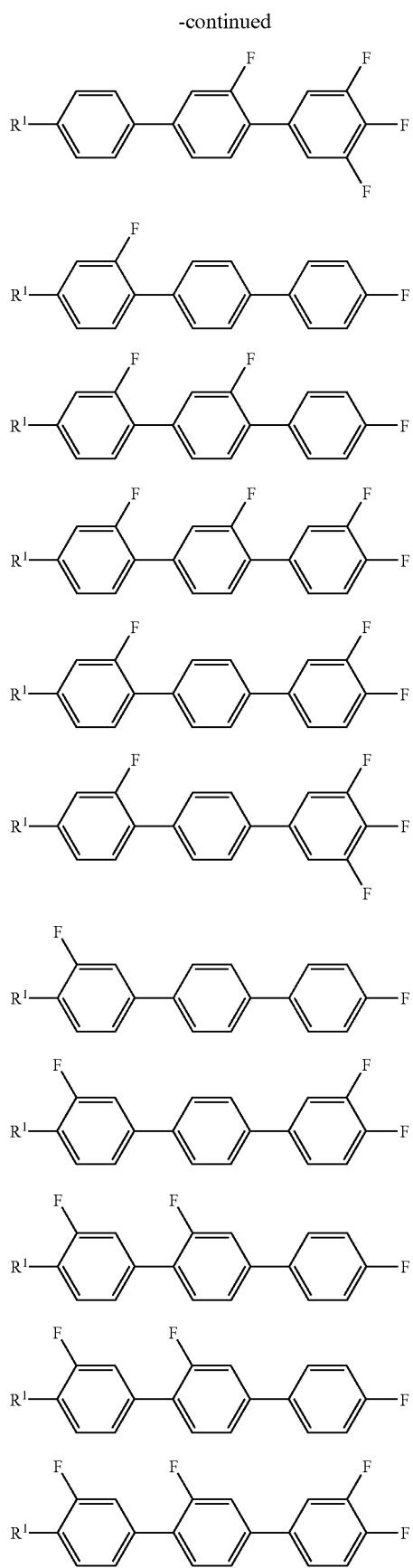
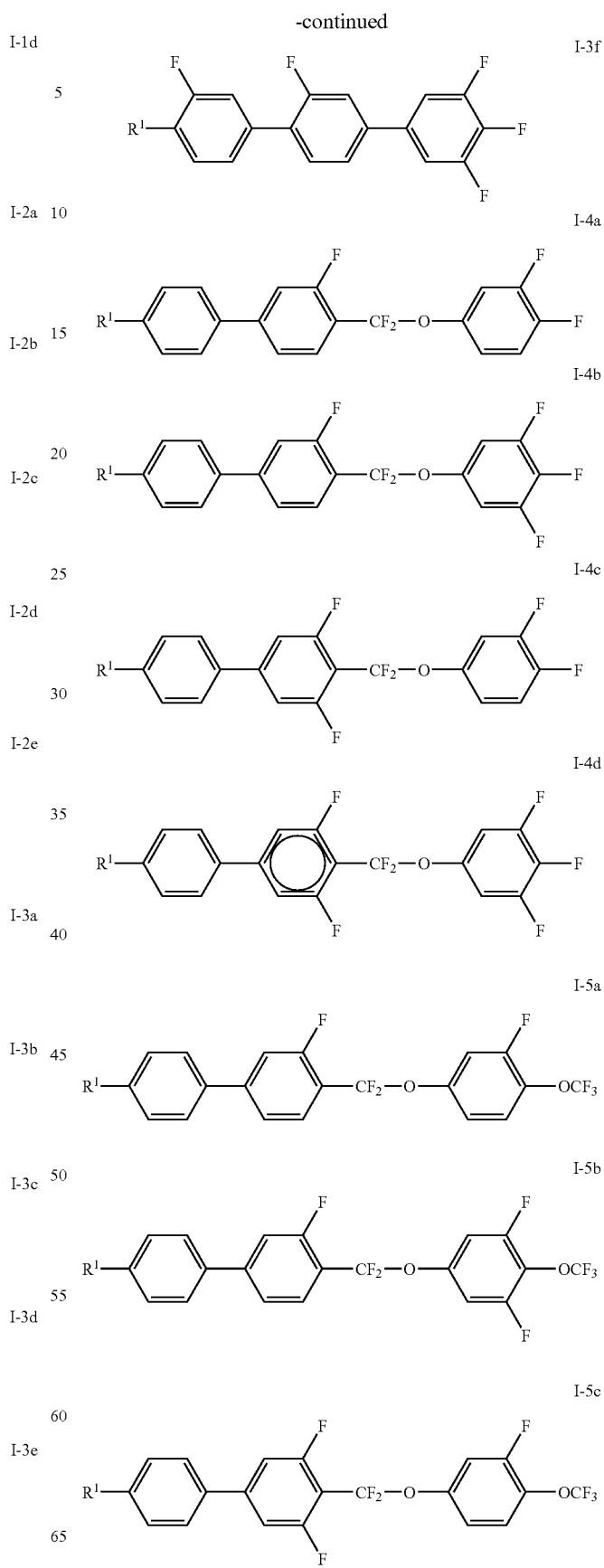

-continued

I-5d

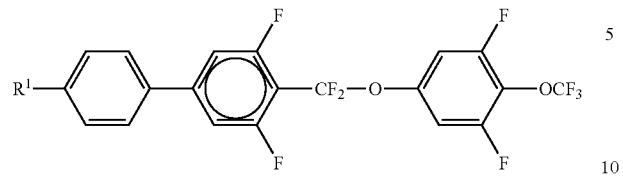

wherein
R¹ has the meaning given under formulae I-1 to I-5 above.

Especially preferred are formulations comprising one or more compounds of formula I-1d and/or one or more compounds of formula I-2b and/or one or more compounds of formula I-3d and/or one or more compounds of formulae I-4d and/or I-5b.

Preferred are liquid crystal compositions comprising in component A one or more compounds selected from the group of formulae II-1 and II-2

II-1

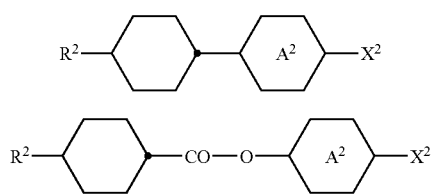

II-2

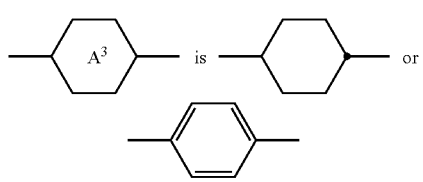

wherein
R², X² and

have the respective meanings given under formula IV above and preferably
R² is n-alkyl with 1 to 5 C-atoms,
X² is F or OCF₃ and

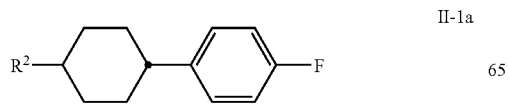

Especially preferred the compounds of formulae II-1 and II-2 are selected from the respective groups II-1a to II-1d and II-2a and II-2b II-1a -continued II-1b II-1c II-1d II-2a II-2b

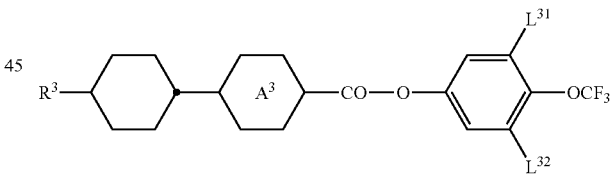

wherein
R² has the meaning given under formulae II-1 and II-2 above.

Preferably component A of the compositions according to the present invention comprise one or more compounds of formula II-1a and/or one or more compounds of formula II-1d, most preferably one or more compounds of formula II-1d.

Preferred are liquid crystal compositions comprising in component A one or more compounds selected from the group of formulae III-1 and III-2

III-1

III-2

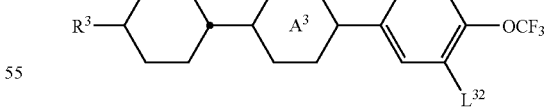

wherein
R³, L³¹, L³² and

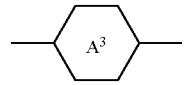

have the respective meanings given under formula III above and preferably

R³ is n-alkyl with 1 to 7, preferably 1 to 5 C-atoms, or 1E-alkenyl with 2 to 7, preferably 2 or 3 C-atoms,

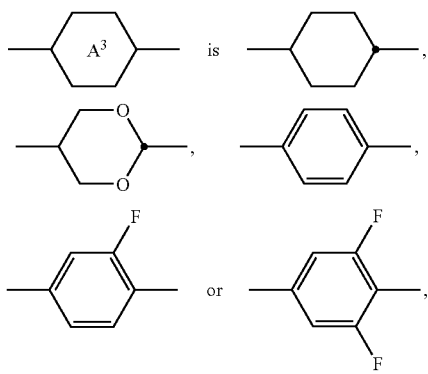

preferably $L^{31}$ and $L^{32}$ both are H.

Especially preferred the compounds of formulae III-1 and III-2 are selected from the respective groups III-1a to III-1h and III-2a to III-2c III-1a
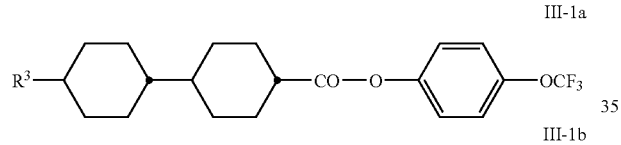

III-1b
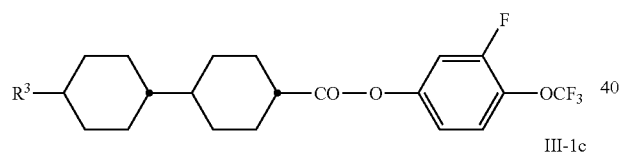

III-1c
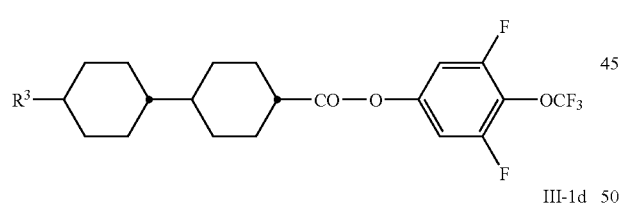

III-1d
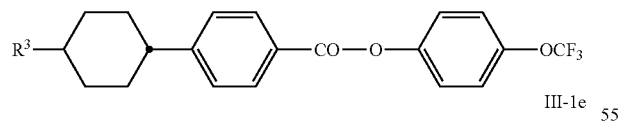

III-1e
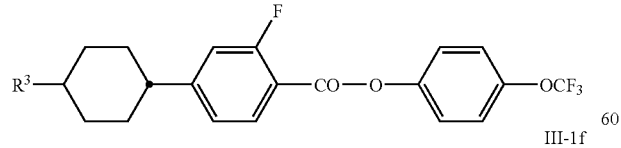

III-1f
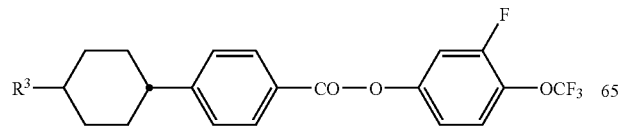

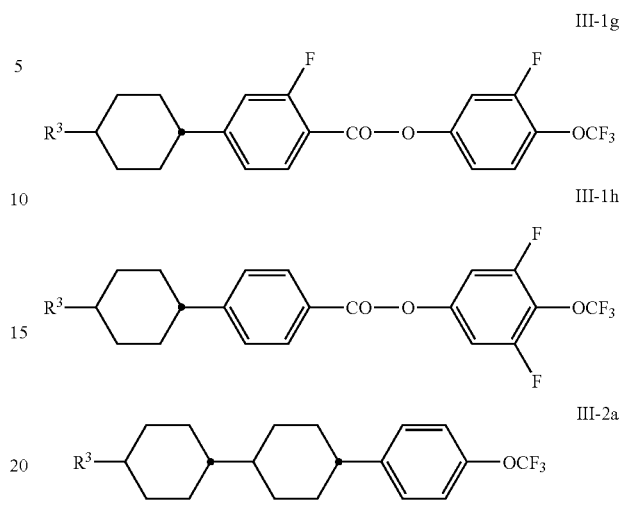

wherein

R³ has the meaning given under formulae III-1 and III-2 above and preferably is alkyl.

Especially preferred are liquid crystal formulations comprising one or more compounds selected from the group of compounds of formulae III-1b, III-2a and III-2b and in particular such formulations comprising one or more compounds of each of these formulae.

Preferred are liquid crystal compositions comprising in component A one or more compounds selected from the group of formulae IV-1 to IV-9

IV-1
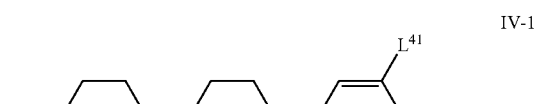

IV-2
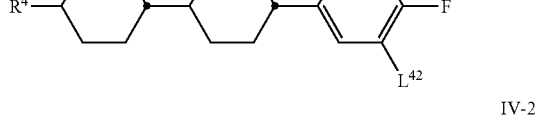

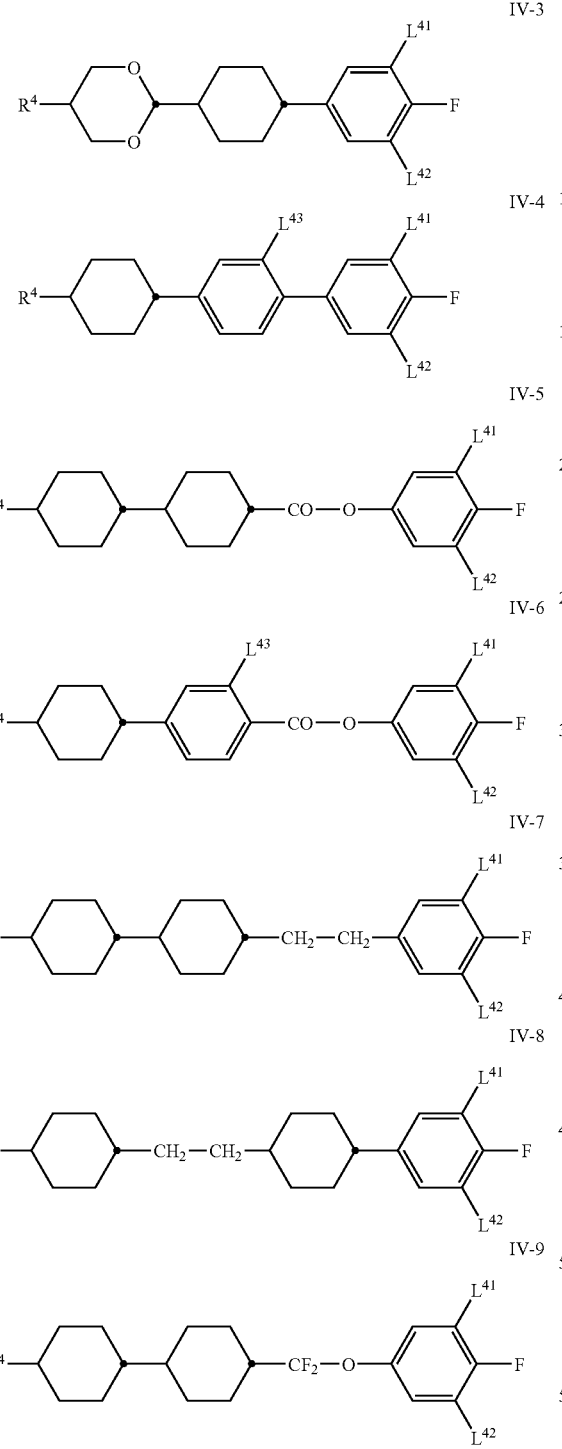

wherein
  $R^4$, $L^{41}$ and $L^{42}$ have the respective meanings given under formula IV above and
  $L^{43}$, independently of the other parameters, has the meaning given for $L^{41}$ under formula IV above, preferably $R^4$ is n-alkyl with 1 to 7 C-atoms, or 1E-alkenyl alkenyl with 2 to 7 C-atoms, $L^{41}$, $L^{42}$ and $L^{43}$ are, independently of each other, H or F, preferably at least one of $L^{41}$ to $L^{43}$ is F, most preferably at least one of $L^{41}$ and $L^{43}$, most preferably at least two of $L^{41}$ to $L^{43}$ are F.

Especially preferred the compounds of formulae IV-1 to IV-8 are selected from the respective groups IV-1 a to IV-1c, IV-2a and IV-2b, IV-3a to IV-3d, IV-a and IV-b, IV5-a to IV-5c, IV-6a to IV-6f, IV7a and IV7-b, IV8-a and IV8-b -continued

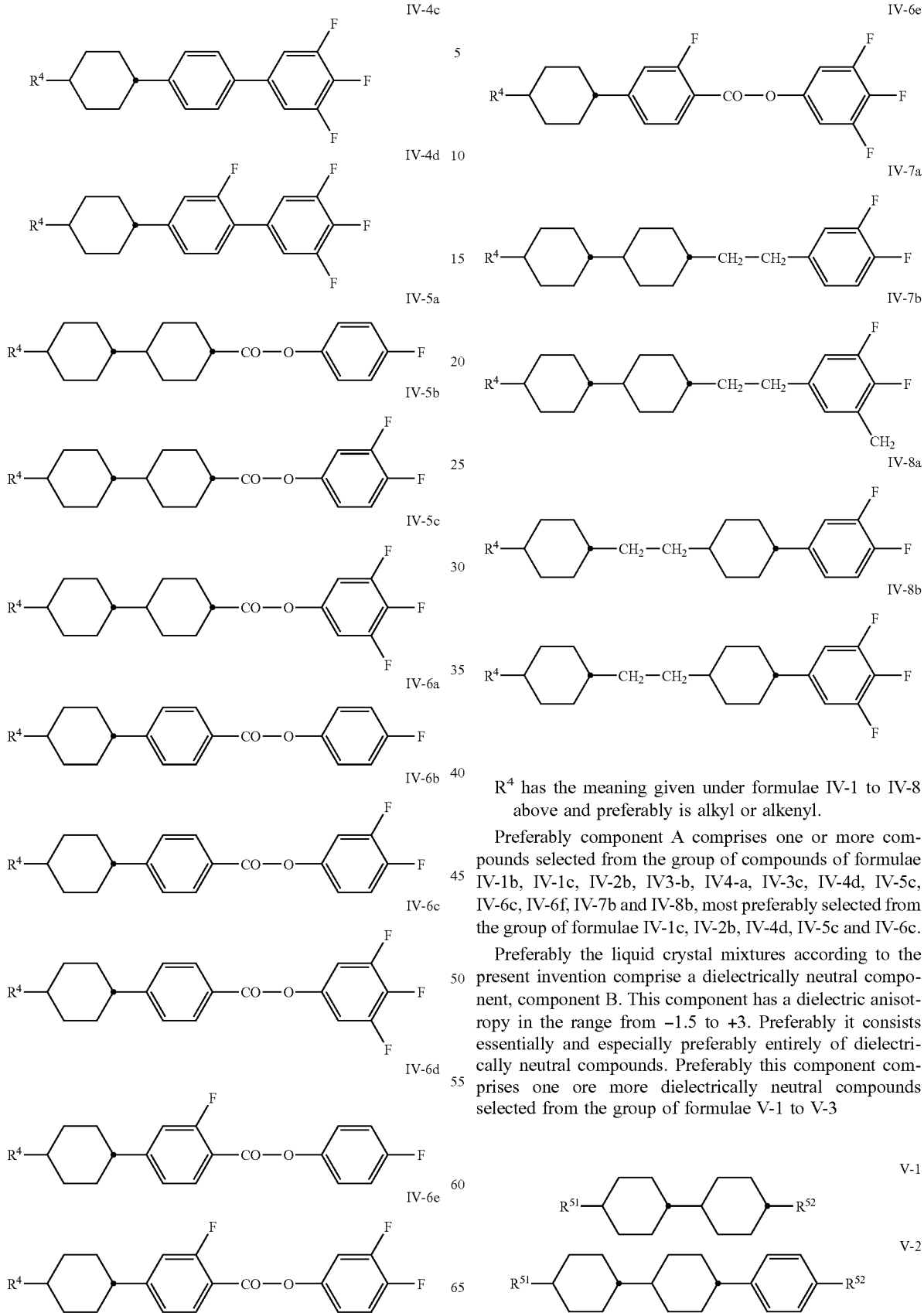

$R^4$ has the meaning given under formulae IV-1 to IV-8 above and preferably is alkyl or alkenyl.

Preferably component A comprises one or more compounds selected from the group of compounds of formulae IV-1b, IV-1c, IV-2b, IV3-b, IV4-a, IV-3c, IV-4d, IV-5c, IV-6c, IV-6f, IV-7b and IV-8b, most preferably selected from the group of formulae IV-1c, IV-2b, IV-4d, IV-5c and IV-6c.

Preferably the liquid crystal mixtures according to the present invention comprise a dielectrically neutral component, component B. This component has a dielectric anisotropy in the range from −1.5 to +3. Preferably it consists essentially and especially preferably entirely of dielectrically neutral compounds. Preferably this component comprises one ore more dielectrically neutral compounds selected from the group of formulae V-1 to V-3

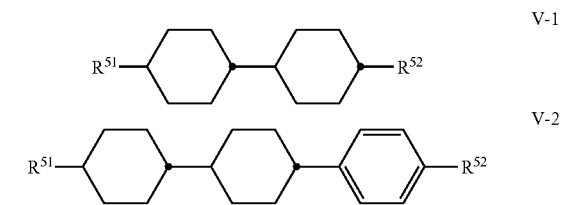

-continued

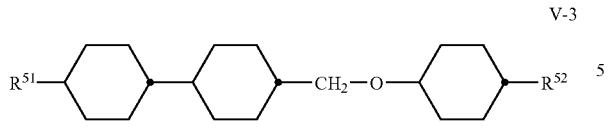
V-3 wherein
R$^{51}$ and R$^{52}$ have the meaning given under formula V above and in formula V-1 preferably at least one of R$^{51}$ and R$^{52}$ is alkenyl, preferably vinyl or 1E-alkenyl, in formula V-2 preferably R$^{51}$ is alkenyl, preferably vinyl or 1E-alkenyl with 3 or more C-atoms and R$^{52}$ preferably is alkyl, preferably n-alkyl, preferably methyl or ethyl and in formula V-3 preferably both R$^{51}$ and R$^{52}$ are, independently of each other, alkyl, preferably n-alkyl.

Further preferred are liquid crystalline media in which the dielectrically positive component, component A comprises one or more compounds of formula VI

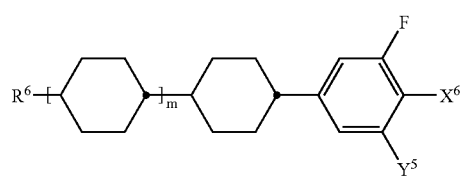
VI wherein
R$^6$ is alkyl, alkoxy, fluorinated alkyl or fluorinated alkoxy with 1 to 7 C-atoms, alkenyl, alkenyloxy, alkoxyalkyl or fluorinated alkenyl with 2 to 7 C-atoms,
X$^6$ is F, Cl or fluorinated alkyl or fluorinated alkoxy, each with 1 to 4 C-atoms, preferably F or Cl, most preferably F and
m is 0 or 2.
wherein, optionally, two of the 6-membered rings may be linked by a group selected from
—CH$_2$—CH$_2$—, —CF$_2$—CF$_2$—, —CF$_2$—O—,
—O—CF$_2$—, —CH$_2$—O—, —O—CH$_2$—,
—CH=CH—, —CF=CF—, —CF=CH—,
—CH=CF—, —C≡C——O—, preferably
—CH$_2$—CH$_2$— and —CF$_2$—O—, most preferably
—CH$_2$—CH$_2$—
and from which compounds of formula II are excluded.

In a preferred embodiment the liquid crystal composition comprises component B which one or more compounds of formula VII

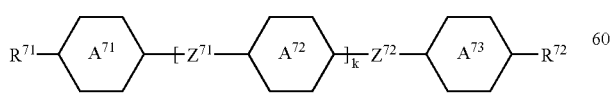
VII wherein
R$^{71}$ and R$^{72}$, independently of each other, have the meaning given for R$^1$ under formula I above,

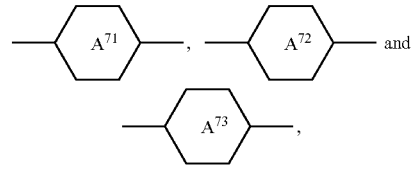

independently of each other, and in case

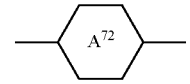

is present twice, also these, independently of each other, are

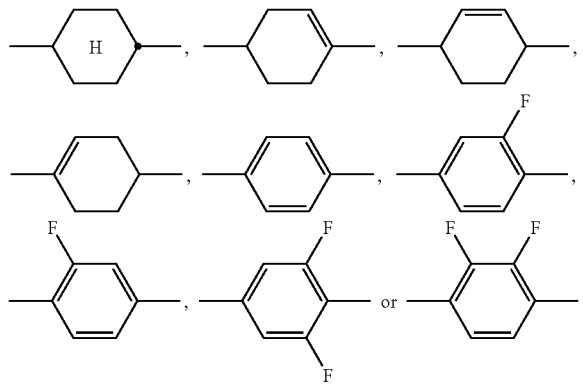

preferably at least one of

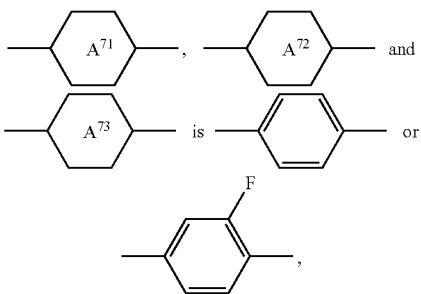

and preferably at least one of

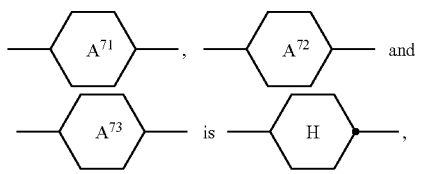

Z$^{71}$ and Z$^{72}$ are, independently of each other, and in case Z$^{71}$ is present twice, also these independently of each other, —CH$_2$CH$_2$—, —COO—, trans —CH=CH—, trans —CF=CF—, —CH$_2$O—, —CF$_2$O— or a single bond, preferably at least one of them is a single bond and most preferably all are a single bond and k is 0, 1 or 2, preferably 1 or 2 from which compounds of formula V are excluded.

Optionally the liquid crystal mixtures according to the present invention comprise a dielectrically negative, component C. This component has a dielectric anisotropy of −1.5 or less, and consists of dielectrically negative compounds having a dielectric anisotropy of −1.5 or less. This component C preferably comprises of compounds formula VIII

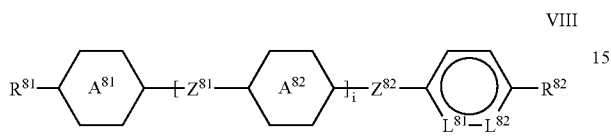

VIII wherein
$R^{81}$ and $R^{82}$ independently of each other have the meaning given for $R^1$ under formula I above,

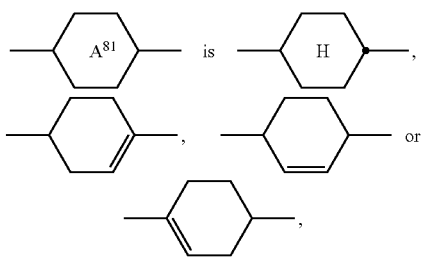

Preferably

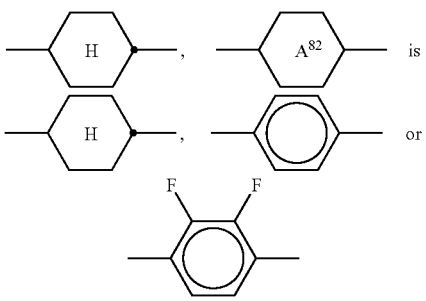

$Z^{81}$ and $Z^{82}$ are, independently of each other, —CH$_2$CH$_2$—, —COO—, trans —CH=CH—, trans —CF=CF—, —CH$_2$O—, —CF$_2$O—, —CH$_2$—O—, —O—CH$_2$—, —CH=CH—, —CF=CF—, —CF=CH—, —CH=CF—, —C≡C— or a single bond, preferably at least one of them is a single bond and most preferably both are a single bond, $L^{81}$ and $L^{82}$ are, independently of each other, =C(—F)— or =N—, preferably at least one of them is =C(—F)— and most preferably both of them are =C(—F)— and i is 0 or 1.

Further preferred are liquid crystalline media in which the dielectrically positive component, component A comprises one or more compounds of formula IX

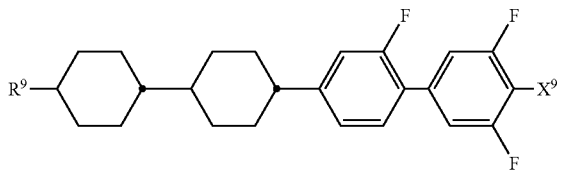

IX-4 wherein
$R^9$ and $X^9$ have the respective meanings given for $R^6$ and $X^6$ under formula VI above and preferably
$R^9$ is n-alkyl with 1 to 5 C-atoms and
$X^9$ is F, Cl, —CF$_3$ or —OCF$_3$, most preferably F.

The compounds of formula VI are preferably selected from the group of sub-formulae VI-1 to VI-18

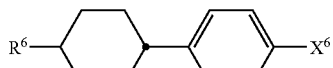

VI-1

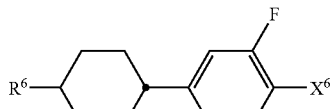

VI-2

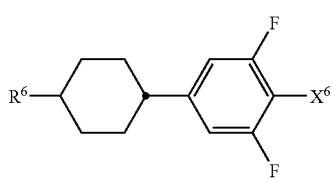

VI-3

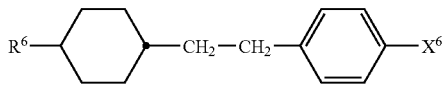

VI-4

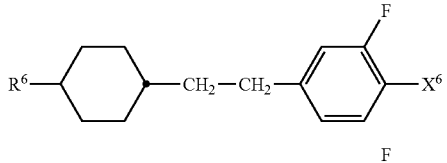

VI-5

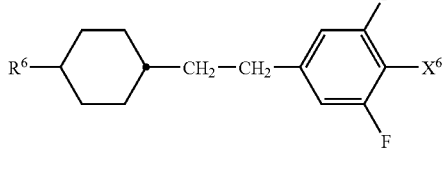

VI-6

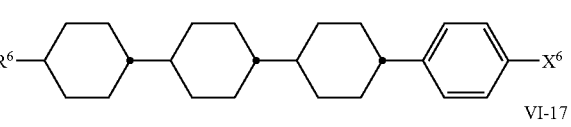

VI-16

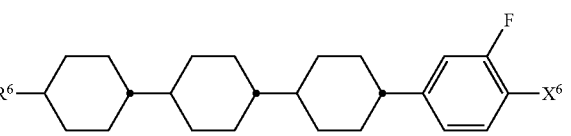

VI-17

-continued

VI-18

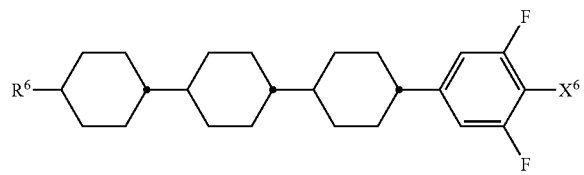

wherein
R⁶ and X⁶ have the respective meanings given under formula VI above and preferably
R⁶ is n-alkyl with 1 to 5 C-atoms or alkenyl with 2 to 5 C-atoms and
X⁶ is F, Cl, —CF₃ or —OCF₃, preferably F or Cl and most preferably F.

Preferably the medium contains compounds of formula VI selected from the group of sub-formulae VI-7 to VI-15 and in particular VI-8 and VI-9.

The compounds of formula VII are preferably selected from the group of sub-formulae VII-1 to VII-10

VII-1
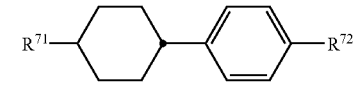

VII-2
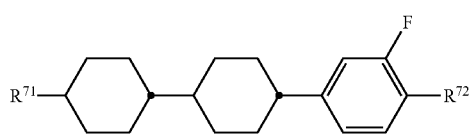

VII-3
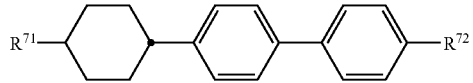

VII-4
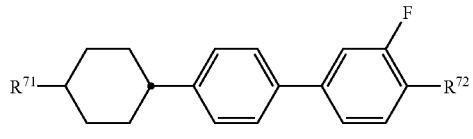

VII-5
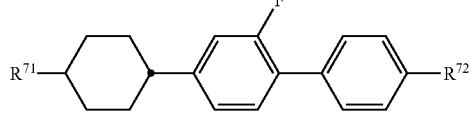

VII-6
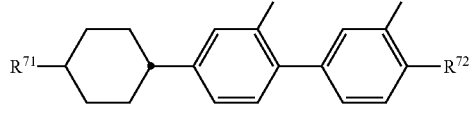

VII-7
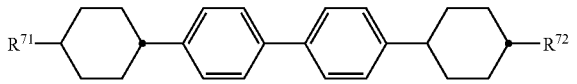

VII-8
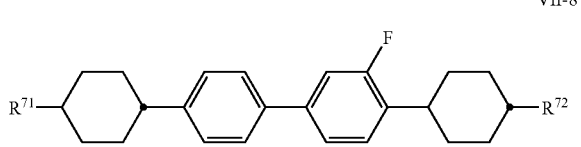

-continued

VII-9
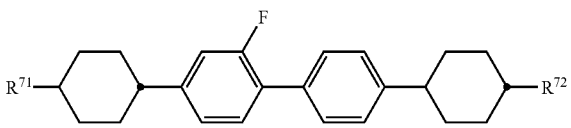

wherein
R⁷¹ and R⁷² have the meaning given under Formula VII above.

Most preferably the medium contains compounds of formula VII selected from the group of sub-formulae VII-1, VII-2, VII-4, VII-6, VII-8 and VII-10 and in particular VII-4, VII-6, VII-8 and VII-10.

Especially preferred are the media comprising compounds of formula IX selected from the group of sub-formulae IX-1 to IX-4

IX-1
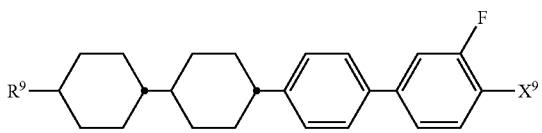

IX-2
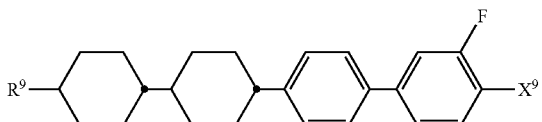

IX-3
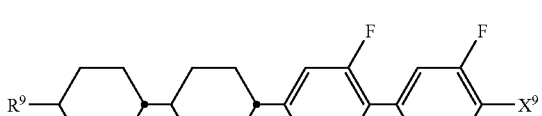

IX-4
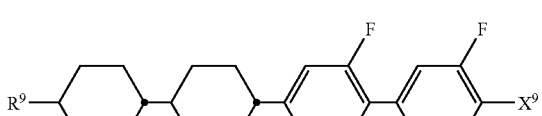

wherein
R⁹ and X⁹ have the respective meanings given under formula IX above.

Preferably the dielectrically positive component, component A comprises one or more compounds each of formulae I, II, III and IV and the dielectrically neutral component B comprises one or more compounds of formula V.

Preferably the dielectrically positive component, component A predominantly and preferably entirely consists of the compounds mentioned, i.e. of the compounds of formulae I, II, III, IV, VI and IX, preferably of the compounds of formulae I, II, III, and IV, the dielectrically neutral component B predominantly and preferably entirely consists of formulae V and VII, preferably of formula V and the dielectrically negative component C predominantly and preferably entirely consists of compounds formula VIII.

In a preferred embodiment the liquid crystal composition consists predominantly, preferably entirely of components A and B, preferably of component A.

The concentration of component A in the formulations according to the instant invention is preferably in the range from 50% to 100%, preferably in the range from 60% to 97%, whereas in a first preferred embodiment the concentration of component A in the formulations is in the range from 50% to 75%, preferably in the range from 55% to 75%, in a second preferred embodiment the concentration of component A in the formulations is in the range from 80% to 100%, preferably in the range from 90% to 98%.

The concentration of component B in the formulations according to the instant invention is preferably in the range from 0% to 50%, preferably in the range from 3% to 45%, whereas in the first preferred embodiment referred to above, the concentration of component B in the formulations is in the range from 20% to 50%, preferably in the range from 25% to 45% and in particular in the range from 30% to 40%, in the second preferred embodiment referred to above, the concentration of component B in the formulations is in the range from 0% to 20%, preferably in the range from 2% to 16% and in particular in the range from 6% to 19%

The concentration of compounds of formula I in the formulations according to the instant invention is preferably in the range from 3% to 30%, preferably in the range from 5% to 20% and in particular in the range from 6% to 19%

The concentration of compounds of formula II in the formulations according to the instant invention is preferably in the range from 1% to 25%, preferably in the range from 2% to 20% and in particular in the range from 3% to 15%.

The concentration of compounds of formula III in the formulations according to the instant invention is preferably 10% or more, preferably. 15% or more, more preferably 20% or more and most preferably 25% or more. It is preferably in the range from 13% to 45%, more preferably in the range from 15% to 40% and most preferably in the range from 20% to 35%.

The concentration of compounds of formula IV in the formulations according to the instant invention is preferably in the range from 15% to 60%, more preferably in the range from 20% to 55% and most preferably in the range from 25% to 50%.

The concentration of compounds of formula V in the formulations according to the instant invention. is preferably in the range from 0% to 50%, more preferably in the range from 2% to 45% and most preferably in the range from 4% to 40%. Depending on the desired polarity of the formulation the upper limit of the concentration of compounds of formula V may also be less, preferably 20% or less, more preferably 15 or less and most preferably 10% or less.

The concentration of the single compounds should be chosen to be not too large. Typical upper limits are in the range of 5 to 20% per individual homologue. The allowable upper limit of the concentration depends on the type of the compound and on the envisaged application, especially the requirement for the lower temperature limits for operation and storage. Generally, the upper limit of the concentration it is lower for compounds with four rings than for compounds with three rings and for these lower than for compounds with two rings. Also generally the upper allowable limit of the concentration is lower for more polar compounds, i.e. for dielectrically neural and for dielectrically positive compounds the limit is lower for compounds with a larger dielectric anisotropy compared to compounds with a smaller dielectric anisotropy. Within a series of homologous compounds the limit typically decreases with increasing length of the side chain, Obviously there are deviations from these rules.

For some of the compounds, which are preferably present in the liquid crystal formulations according to the present invention, preferred upper limits of the concentration of the individual homologues have been determined.

The concentration of compounds of formula I-1d with $R^2$ being an alkyl group is preferably 11% or less per homologous compound.

The concentration of compounds of formula II-1d with $R^2$ being an alkyl group, preferably a propyl group, is preferably 10% or less and especially preferred 8% or less per homologous compound.

The concentration of compounds of formula III-1b with $R^1$ being an ethyl group is preferably 11% or less, whereas the concentration of compounds of formula III-1b with $R^1$ being an n-propyl group is preferably 9% or less.

The concentration of compounds of formula V-3 with $R^{51}$ and $R^{52}$, independently of each other, being an alkyl group is preferably 8% or less and especially preferred 5% or less per homologous compound.

Preferably the liquid crystalline media according to the instant invention contain a component A comprising, preferably predominantly consisting of and most preferably entirely consisting of compounds selected from the group of formulae I to IV.

Comprising in this application means in the context of compositions that the entity referred to, e.g. the medium (the formulation) or the component, contains the component or components or of the compound or compounds in question, preferably in a total concentration of 10% or more and most preferably of 20% or more, unless explicitly stated otherwise.

Predominantly consisting, in this context, means that the entity referred to contains 80% or more, preferably 90% or more and most preferably 95% or more of the component or components or of the compound or compounds in question unless explicitly stated otherwise.

Entirely consisting, in this context, means that the entity referred to contains 98% or more, preferably 99% or more and most preferably 100.0% of the component or components or of the compound or compounds in question unless explicitly stated otherwise.

Preferably component A comprises one or more compounds of formula I, preferably compounds in wherein $X^1$ is F, preferably of formula I-1 and in particular of formula I-1d.

Preferably component A further comprises one or more compounds of formula II, wherein the ring $A^2$ is trans-1,4-cyclohexylene and preferably $X^2$ is $CF_3$, most preferably of formula II-1 and in particular of formula II-1d.

Preferably component A also comprises one or more compounds of formula III, preferably compounds wherein $Z^{31}$ is —CO—O— and/or $Z^{32}$ is a single bond and/or $L^{31}$ is F, preferably one or more compounds of formula III-1 and/or one or more compounds of formula III-2, especially preferred one or more compounds of formula III-1e and/or one or more compounds of formula III-2a and/or one or more compounds of formula III-2b.

Also preferably, component A comprises one or more compounds of formula IV, preferably compounds wherein $L^{41}$ is F and/or $Z^{41}$ is a single bond or a —CO—O— and/or $Z^{42}$ is a single bond, preferably one or more compounds of formula IV-1 and/or one or more compounds of formula IV-2, and/or one or more compounds of formula IV-3, especially preferred one or more compounds of formula IV-1b and/or one or more compounds of formula IV-1c and/or one or more compounds of formula IV-2b and/or one or more compounds of formula IV-4b.

Preferably, component B comprises one or more compounds of formula V, preferably compounds wherein $R^{51}$ and $R^{52}$ are independently of each other alkyl or alkenyl, preferably n-alkyl including methyl and ethyl or 1E-alkenyl including vinyl, preferably one or more compounds of formula V-1 and/or one or more compounds of formula V-2, and/or one or more compounds of formula V-3, especially preferred one or more compounds of formula V-1 wherein $R^{51}$ and $R^{52}$ are, independently of each other, alkyl and/or one or more compounds of formula V-1 wherein $R^{51}$ is alkyl and $R^{52}$ is alkenyl and/or one or more compounds of formula V-2 wherein $R^{51}$ is alkenyl and $R^{52}$ is alkyl and/or one or more compounds of formula V-3 wherein $R^{51}$ and $R^{52}$ are, independently of each other, alkyl.

In a preferred embodiment the liquid crystalline media according to the instant invention contains a component B predominantly consisting of and most preferably entirely consisting of compounds of formula V.

Especially preferred are media comprising compounds selected from the group of formulae VI-8, VI-11 and VI-13 and/or VI-9, VI-12 and VI-15, in particular with $R^6$ being alkenyl, especially vinyl.

In a further preferred embodiment the liquid crystal medium contains a liquid crystal component C, which is preferably predominantly consisting of and most preferably entirely consisting of compounds of formula VIII.

This component C may be present, and preferably is present, besides components A and B.

Also other mesogenic, as well as non-mesogenic, compounds, which are not explicitly mentioned above, can optionally and beneficiously be used in the media according to the instant invention. Such compounds are known to the expert in the field.

Optionally, the inventive media can comprise further liquid crystal compounds in order to adjust the physical properties. Such compounds are known to the expert. Their concentration in the media according to the instant invention is preferably 0% to 30%, more preferably 0% to 20% and most preferably 0.5% to 15%.

Preferably the liquid crystal medium contains 50% to 100%, more preferably 70% to 100% and most preferably 80% to 100% and in particular 90% to 100% totally of components A, B and C, which contain, preferably predominantly consist of and most preferably entirely consist of one or more of compounds of formulae I to and VIII, respectively.

The liquid crystal media according to the instant invention are characterized by a clearing point of 66° C. or more, preferably of 70° C. or more and in particular of 75° C. or more. Obviously also significantly higher clearing points can be beneficiously realised.

The Δn of the liquid crystal media according to the instant invention is preferably in the range from 0.07 to 0.12, preferably in the range of 0.075 to 0.115, more preferably in the range of 0.075 to 0.110, most preferably in the range of 0.080 to 0.105 and in particular in the range of 0.080 to 0.100.

The $\Delta\in$, at 1 kHz and 20° C., of the liquid crystal media according to the invention is 6.0 or more, preferably 9.0 or more, most preferably 10.0 or more and in particular 11.0 or more. It is, however, preferably 17.0 or less, more preferably 15.0 or less and most preferably 12.0 or less.

Preferably the threshold voltage of the liquid crystal media according to the invention are in the range from 0.8 V to 1.8 V, more preferably in range from 0.9 V to 1.7 V, more preferably in range from 0.9 V to 1.6 V, and in particular in the range from 1.0 V to 1.3 V or in the range from 1.5 V to 1.6 V, depending on the driver used for the display.

The operating voltages of the liquid crystal media according to the invention are preferably those of 2.5 V-, 3.3 V-, 4 V- or 5 V-drivers. Particularly preferred are those of 4 V- and 5 V-drivers.

The rotational viscosity of the liquid crystal media according to the invention are preferably in the range from 50 mPa·s to 200 mPa·s, preferably in the range from 60 mPa·s to 180 mPa·s and in particular in the range from 70 mPa·s to 140 mPa·s.

For media with a threshold voltage in the range from 1.0 V to 1.3 V the rotational viscosity is preferably in the range from 120 mPa·s to, 180 mPa·s , whereas for media with a threshold voltage in the range from 1.5V to 1.6V the rotational viscosity is preferably in the range from 70 mPa·s to 130 mPa·s .

Preferably the nematic phase of the inventive media extends at least from 0° C. to 65° C., more preferably at least from −20° C. to 70° C., most preferably at least from −30° C. to 80° C. and in particular at least from −40° C. to 80° C., wherein at least means that preferably the lower limit is under cut, wherein the upper limit is surpassed.

In the present application the term dielectrically positive compounds describes compounds with $\Delta\in>3.0$, dielectrically neutral compounds are compounds with $-1.5 \leq \Delta\in \leq 3.0$ and dielectrically negative compounds are compounds with $\Delta\in<-1.5$. The same definition is used for components. $\Delta\in$ is determined at 1 kHz and 20° C. The dielectric anisotropies of the compounds is determined from the results of a solution of 10% of the individual compounds in a nematic host mixture. The capacities of these test mixtures are determined both in a cell with homeotropic and with homogeneous alignment. The cell gap of both types of cells is approximately 20 µm. The voltage applied is a rectangular wave with a frequency of 1 kHz and a root mean square value typically of 0.5 V to 1.0 V, however, it is always selected to be below the capacitive threshold of the respective test mixture.

For dielectrically positive compounds the mixture ZLI-4792 and for dielectrically neutral, as well as for dielectrically negative compounds, the mixture ZLI-3086, both of Merck KGaA, Germany are used as host mixture, respectively. The dielectric permittivities of the compounds are determined from the change of the respective values of the host mixture upon addition of the compounds of interest and are extrapolated to a concentration of the compounds of interest of 100%. Components having a nematic phase at the measurement temperature of 20° C. are measured as such, all others are treated like compounds.

The term threshold voltage refers in the instant application to the optical threshold and is given for 10% relative contrast ($V_{10}$) and the term saturation voltage refers to the optical saturation and is given for 90% relative contrast ($V_{90}$) both, if not explicitly stated otherwise. The capacitive threshold voltage ($V_0$, also called Freedericksz-threshold $V_{Fr}$) is only used if explicitly mentioned.

The ranges of parameters given in this application are all including the limiting values, unless explicitly stated otherwise.

Throughout this application, unless explicitly stated otherwise, all concentrations are given in mass percent and relate to the respective complete mixture, all temperatures, e.g. the melting point T(C,N), the transition from the smectic (S) to the nematic (N) phase T(S,N) and the clearing point T (N,I) of the liquid crystals are given in degrees centigrade (Celsius) and all differences of temperatures in degrees centigrade, unless explicitly stated otherwise. All physical properties have been and are determined according to "Merck Liquid Crystals, Physical Properties of Liquid Crystals", Status November 1997, Merck KGaA, Germany and are given for a temperature of 20° C., unless explicitly stated otherwise. The optical anisotropy (Δn) is determined at a wavelength of 589.3 nm. The dielectric anisotropy (Δ∈) is determined at a frequency of 1 kHz. The threshold voltages, as well as all other electro-optical properties have been determined with test cells prepared at Merck KGaA, Germany. The test cells for the determination of Δ∈ had a cell gap of 22 μm. The electrode was a circular ITO electrode with an area of 1.13 cm$^2$ and a guard ring. The orientation layers were lecithin for homeotropic orientation (∈∥) and polyimide AL-1054 from Japan Synthetic Rubber for homogeneuous orientation (∈$_\perp$). The capacities were determined with a frequency response analyser Solatron 1260 using a rectangular wave with a voltage of 0.3 V$_{rms}$. The light used for the electro-optical measurements was white light. The set up used was a commercially available equipment of Otsuka, Japan. The characteristic voltages have been determined under perpendicular observation. The threshold-(V$_{10}$) mid grey-(V$_{50}$)- and saturation voltages (V$_{90}$) have been determined for 10%, 50% and 90% relative contrast, respectively under perpendicular observation.

The liquid crystal media according to the present invention can contain further additives and chiral dopants in usual concentrations. The total concentration of these further constituents is in the range of 0% to 10%, preferably 0.1% to 6%, based on the total mixture. The concentrations of the individual compounds used each are preferably in the range of 0.1% to 3%. The concentration of these and of similar additives is not taken into consideration for the values and ranges of the concentrations of the liquid crystal components and compounds of the liquid crystal media in this application.

The inventive liquid crystal media according to the present invention consist of several compounds, preferably of 3 to 30, more preferably of 8 to 20 and most preferably of 10 to 18 compounds.

These compounds are mixed in conventional way. As a rule, the required amount of the compound used in the smaller amount is dissolved in the compound used in the greater amount. In case the temperature is above the clearing point of the compound used in the higher concentration, it is particularly easy to observe completion of the process of dissolution. It is, however, also possible to prepare the media by other conventional ways, e.g. using so called pre-mixtures, which can be e.g. homologous or eutectic mixtures of compounds or using so called multi-bottle-systems, the constituents of which are ready to use mixtures themselves.

By addition of suitable additives, the liquid crystal media according to the instant invention can be modified in such a way, that they are usable in all known types of liquid crystal displays, either using the liquid crystal media as such, like TN-, TN-AM-, IPS- and OCB-LCDs and in particular in TN-AMDs.

In the present application and especially in the following examples, the structures of the liquid crystal compounds are represented by abbreviations also called acronyms. The transformation of the abbreviations into the corresponding structures is straight forward according to the following two tables A and B. All groups C$_n$H$_{2n+1}$ and C$_m$H$_{2m+1}$ are straight chain alkyl groups with n respectively m C-atoms. The interpretation of table B is self-evident. Table A lists the abbreviations for the cores of the structures only. The individual compounds are denoted by the abbreviation of the core, followed by a hyphen and a code specifying the substituents R$^1$, R$^2$, L$^1$ and L$^2$ as follows:

| Code for R$^1$, R$^2$, L$^1$, L$^2$ | R$^1$ | R$^2$ | L$^1$ | L$^2$ |
|---|---|---|---|---|
| nm | C$_n$H$_{2n+1}$ | C$_m$H$_{2m+1}$ | H | H |
| nOm | C$_n$H$_{2n+1}$ | OC$_m$H$_{2m+1}$ | H | H |
| nO.m | OC$_n$H$_{2n+1}$ | C$_m$H$_{2m+1}$ | H | H |
| n | C$_n$H$_{2n+1}$ | CN | H | H |
| nN.F | C$_n$H$_{2n+1}$ | CN | F | H |
| nN.F.F | C$_n$H$_{2n+1}$ | CN | F | F |
| nF | C$_n$H$_{2n+1}$ | F | H | H |
| nF.F | C$_n$H$_{2n+1}$ | F | F | H |
| nF.F.F | C$_n$H$_{2n+1}$ | F | F | F |
| nOF | OC$_n$H$_{2n+1}$ | F | H | H |
| nCl | C$_n$H$_{2n+1}$ | Cl | H | H |
| nCl.F | C$_n$H$_{2n+1}$ | Cl | F | H |
| nCl.F.F | C$_n$H$_{2n+1}$ | Cl | F | F |
| nCF$_3$ | C$_n$H$_{2n+1}$ | CF$_3$ | H | H |
| nCF$_3$.F | C$_n$H$_{2n+1}$ | CF$_3$ | F | H |
| nCF$_3$.F.F | C$_n$H$_{2n+1}$ | CF$_3$ | F | F |
| nOCF$_3$ | C$_n$H$_{2n+1}$ | OCF$_3$ | H | H |
| nOCF$_3$.F | C$_n$H$_{2n+1}$ | OCF$_3$ | F | H |
| nOCF$_3$.F.F | C$_n$H$_{2n+1}$ | OCF$_3$ | F | F |
| nOCF$_2$ | C$_n$H$_{2n+1}$ | OCHF$_2$ | H | H |
| nOCF$_2$.F | C$_n$H$_{2n+1}$ | OCHF$_2$ | F | H |
| nOCF$_2$.F.F | C$_n$H$_{2n+1}$ | OCHF$_2$ | F | F |
| nNS | C$_n$H$_{2n+1}$ | NCS | H | H |
| nS.F | C$_n$H$_{2n+1}$ | NCS | F | H |
| nS.F.F | C$_n$H$_{2n+1}$ | NCS | F | F |
| rVsN | C$_r$H$_{2r+1}$—CH=CH—C$_s$H$_{2s}$— | CN | H | H |
| rEsN | C$_r$H$_{2r+1}$—O—C$_s$H$_{2s}$— | CN | H | H |
| nAm | C$_n$H$_{2n+1}$ | COOC$_m$H$_{2m+1}$ | H | H |

TABLE A

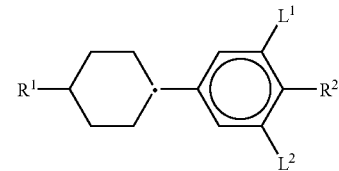

PCH

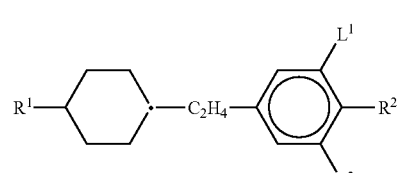

EPCH

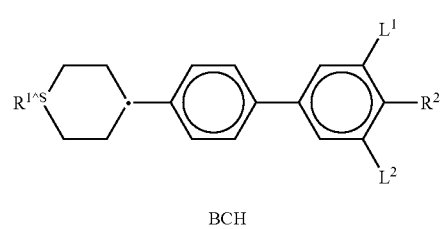

BCH

TABLE A-continued
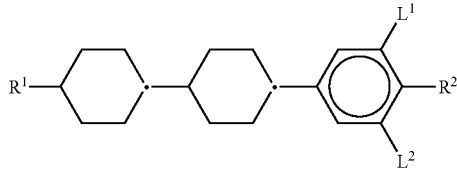
CCP
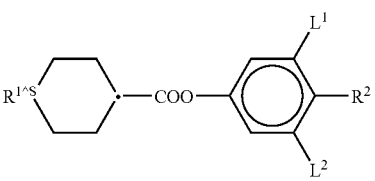
EBCH
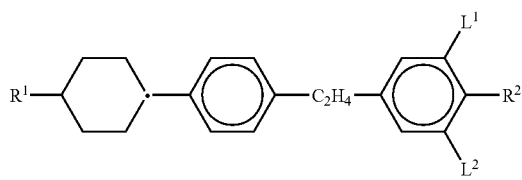
BECH
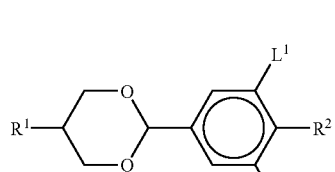
ECCP
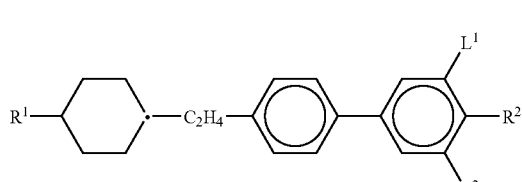
CECP
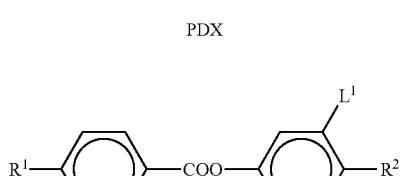
CEPTP
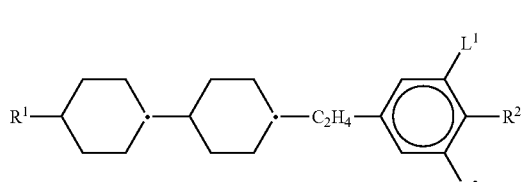
CCH
TABLE A-continued
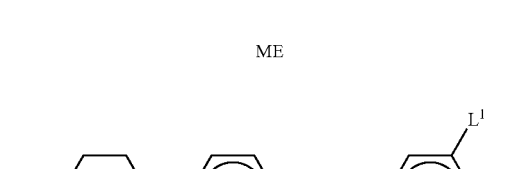
D
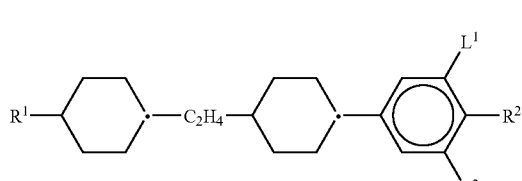
PDX
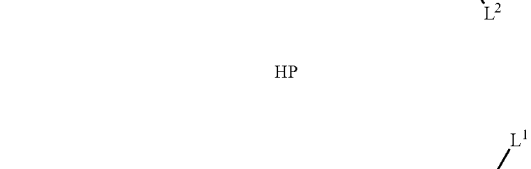
ME
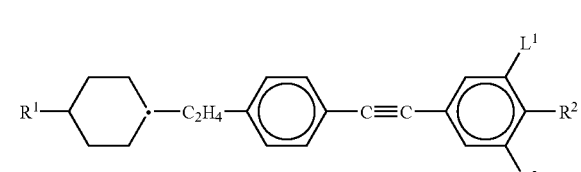
HP
EHP
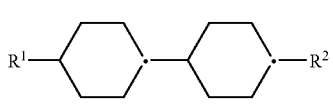
FET TABLE B
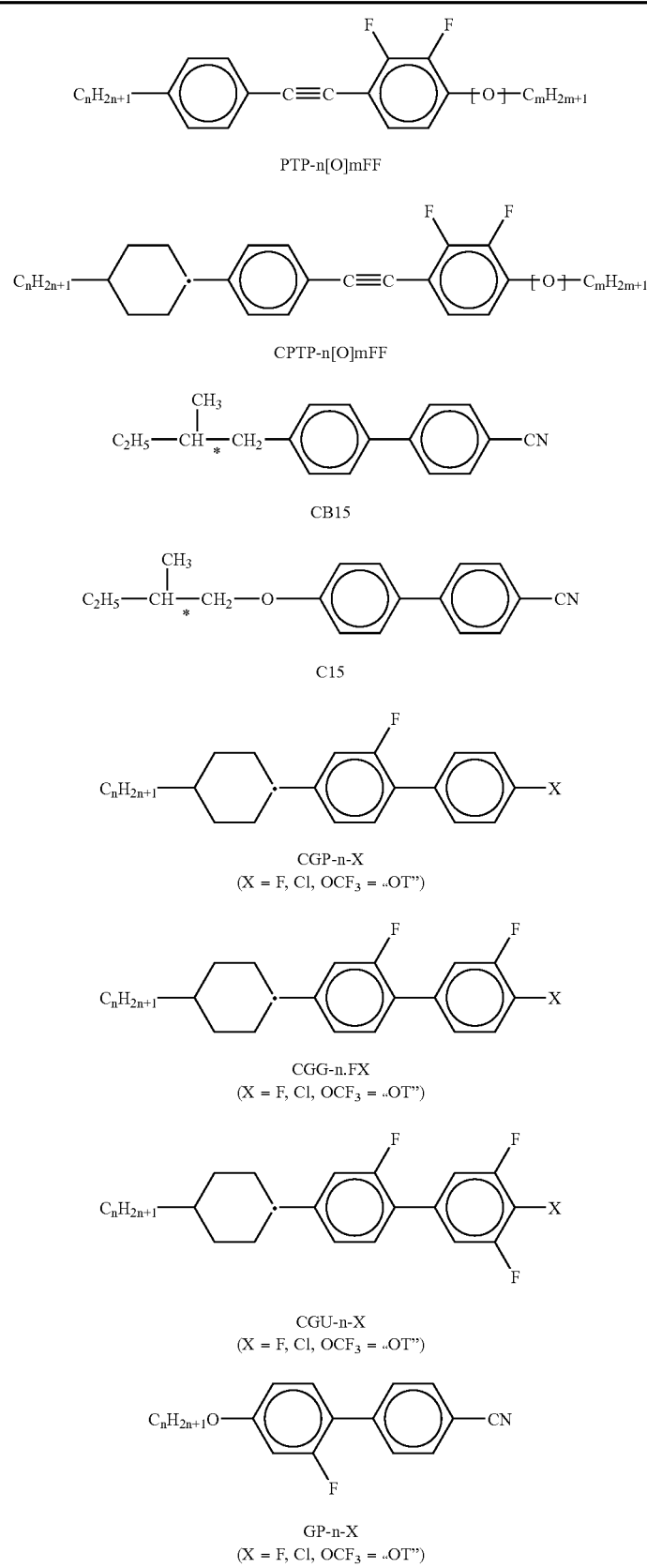

TABLE B-continued
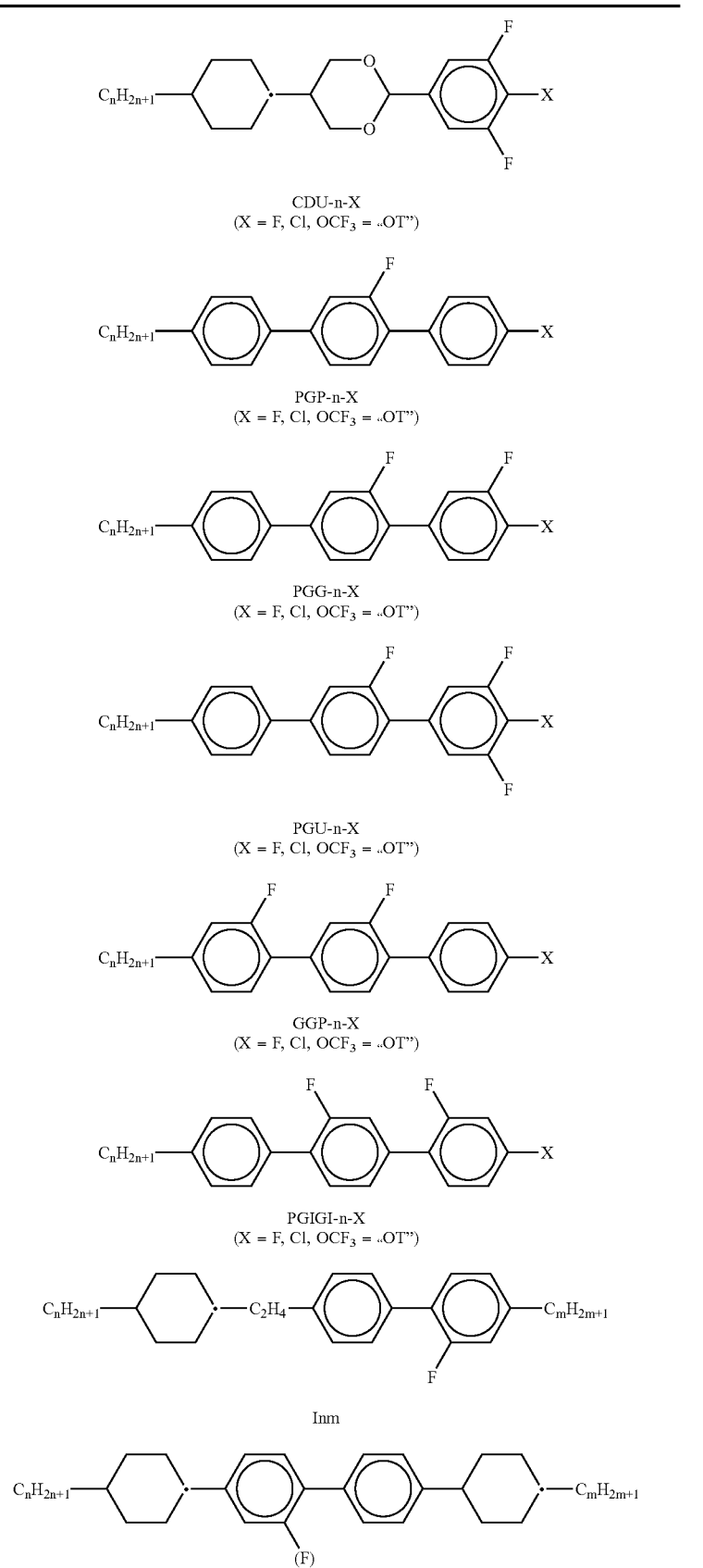

TABLE B-continued
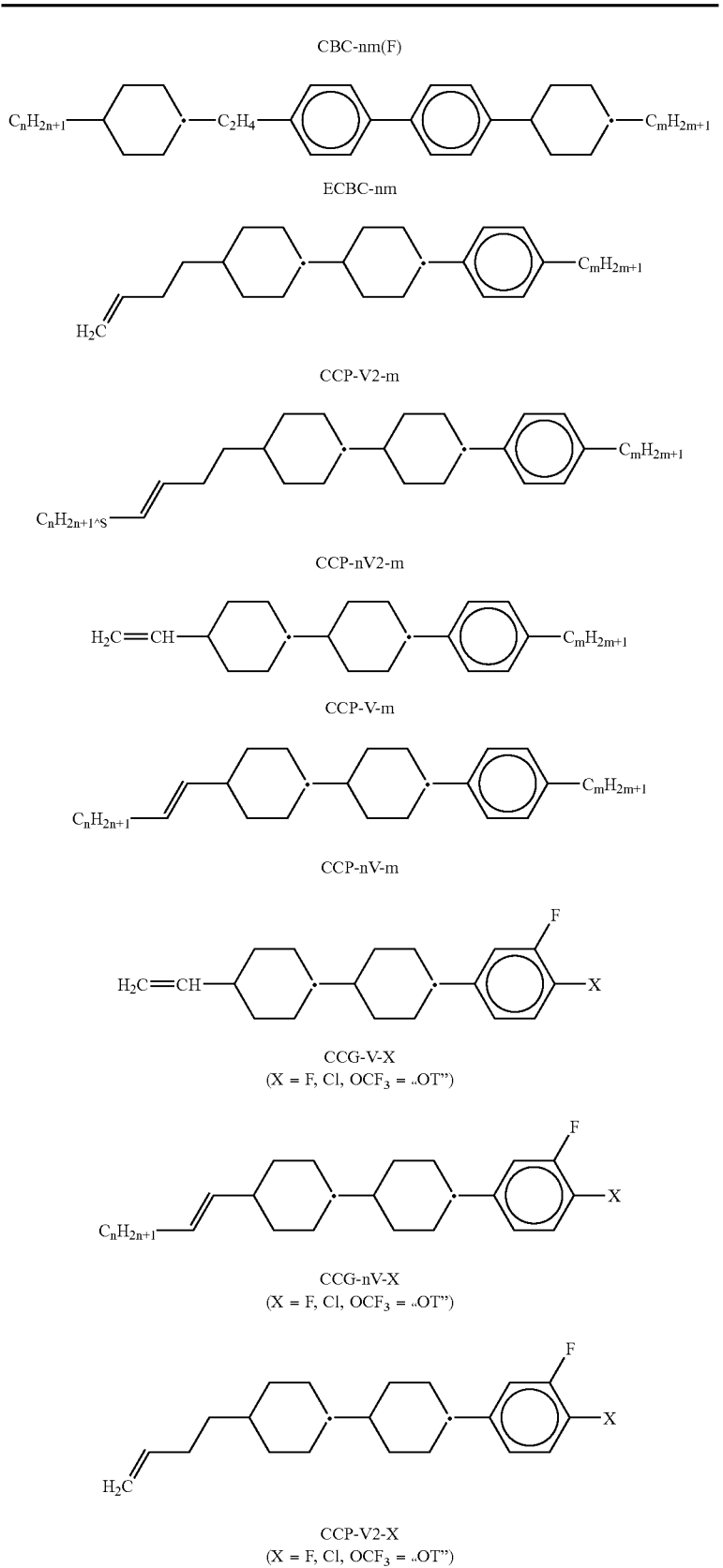

TABLE B-continued

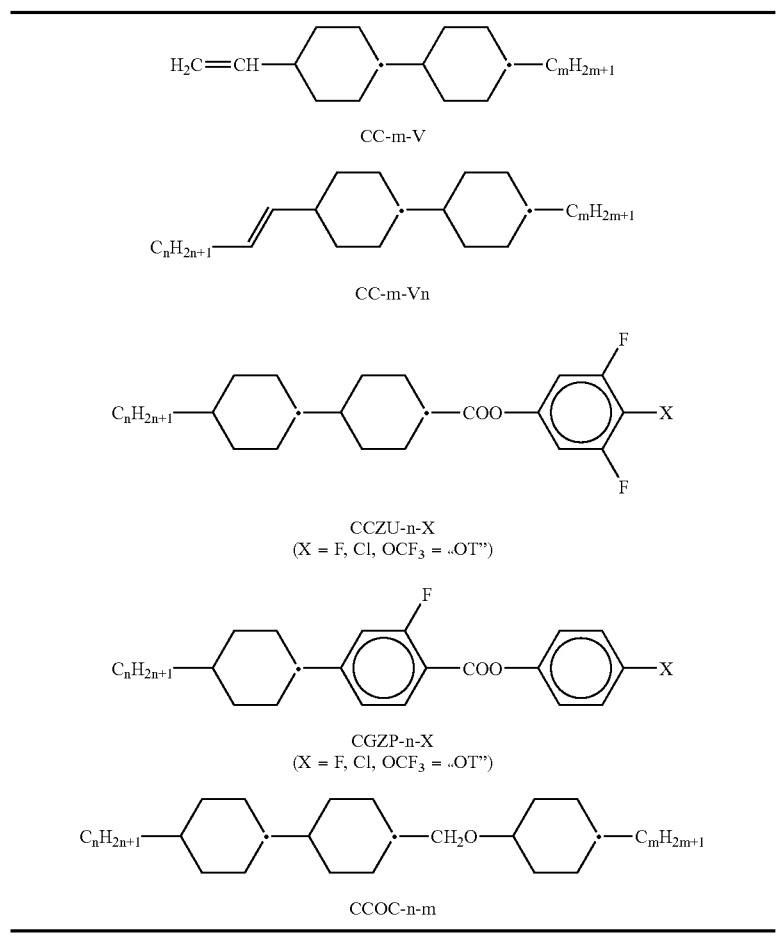

The liquid crystal media according to the instant invention do contain preferably

- seven or more, preferably eight or more compounds, preferably of different formulae, selected from the group of compounds of formulae of tables A and B and/or
- one, two or more, preferably three or more compounds, preferably of different formulae, selected from the group of compounds of formulae of table A and/or
- two, three, four or more, preferably five or more compounds, preferably of different formulae, selected from the group of compounds of formulae of table B.

EXAMPLES

The examples given in the following are illustrating the present invention without limiting it in any way.

However, they illustrate typical preferred embodiments. They show the use of typical and preferred constituents and illustrate their concentrations by way of example. Further they show possible variations of the physical properties of the compositions, illustrating to the expert which properties can be achieved and in which ranges they can be modified. Especially the combination of the various properties, which can be preferably achieved, is thus well defined for the expert.

Comparative Example 1

A liquid crystal mixture is realised with the composition and properties given in the following table.

| No. | Composition Compound Abbreviation | Conc./% | Physical Properties | |
|---|---|---|---|---|
| 1 | PCH-7F | 9.0 | T(N, I) = | 70° C. |
| 2 | CCH-34 | 5.0 | T(S, N) < | −40° C. |
| 3 | CCH-35 | 4.0 | $n_e$ (20° C., | 1.5606 |
| 4 | PCH-301 | 13.0 | 589.3 nm) = | |
| 5 | CCP-20CF3 | 5.0 | $\Delta n$ (20° C., | 0.0760 |
| 6 | CCP-30CF3 | 5.0 | 589.3 nm) = | |
| 7 | CCP-40CF3 | 5.0 | $\epsilon_\parallel$ (20° C., 1 kHz) = | 9.5 |
| 8 | ECCP-3F | 5.0 | $\Delta\epsilon$ (20° C., | 6.1 |
| 9 | BCH-3F.F | 7.0 | 1 kHz) = | |
| 10 | CCP-2F.F.F | 10.0 | $\gamma_1$ (20° C.) = | 94 mPa · s |
| 11 | CCP-3F.F.F | 13.0 | $k_1$ (20° C.) = | 10.5 pN |
| 12 | CCP-5F.F.F | 6.0 | $k_3/k_1$ (20° C.) = | 1.25 pN |
| 13 | CCZU-2-F | 6.0 | $V_0$ (20° C.) = | 1.40 V |
| 14 | CCZU-3-F | 7.0 | d · $\Delta n$ = | 0.55 μm |
| Σ | | 100.0 | $V_{10}$ (20° C.) = | 1.66 V |
| | | | $V_{50}$ (20° C.) = | 2.00 V |
| | | | $V_{90}$ (20° C.) = | 2.43 V |

This mixture does not contain any compounds of formulae I and II according to the present invention. It has an unfavourable combination of the clearing point and rotational viscosity $(T(N,I)/\gamma_1)$, which leads to only moderate response times.

Example 1

A liquid crystal mixture according to the present invention is realised with the composition and properties given in the following table.

| | Composition Compound | | | |
|---|---|---|---|---|
| No. | Abbreviation | Conc./% | Physical Properties | |
| 1 | CCP-2OCF3 | 4.0 | $T(N, I) =$ | 74° C. |
| 2 | CCP-2F.F.F | 7.0 | $T(S, N) <$ | −40° C. |
| 3 | CDU-2-F | 8.0 | $n_e$ (20° C., | 1.5611 |
| 4 | CDU-3-F | 7.0 | 589.3 nm) = | |
| 5 | CCZU-2-F | 3.0 | $\Delta n$ (20° C., | 0.0851 |
| 6 | CCZU-3-F | 15.0 | 589.3 nm) = | |
| 7 | PGU-2-F | 10.0 | $\epsilon_\parallel$ (20° C., 1 kHz) = | 14.2 |
| 8 | CGZP-2-OT | 8.0 | $\Delta\epsilon$ (20° C., | 10.0 |
| 9 | CCG-V-F | 3.0 | 1 kHz) = | |
| 10 | CCP-V-1 | 3.0 | $\gamma_1$ (20° C.) = | 92 mPa·s |
| 11 | CC-5-V | 12.0 | $d \cdot \Delta n =$ | 0.50 μm |
| 12 | CC-3-V1 | 12.0 | $V_{10}$ (20° C.) = | 1.31 V |
| 13 | CCH-35 | 3.0 | | |
| 14 | CCH-3CF3 | 3.0 | | |
| 15 | CCP-2OCF3.F | 4.0 | | |
| Σ | | 100.0 | | |

This mixture has a very favourable value of $\Delta n$ and an extremely good combination of the clearing point and rotational viscosity $(T(N,I)/\gamma_1)$, which leads to outstanding response times. It has even a slightly lower rotational viscosity compared to comparative example 1, though its clearing point is higher and its threshold voltage is lower.

Example 2

A liquid crystal mixture is realised with the composition and properties given in the following table.

| | Composition Compound | | | |
|---|---|---|---|---|
| No. | Abbreviation | Conc./% | Physical Properties | |
| 1 | CCP-2OCF3 | 4.0 | $T(N, I) =$ | 82° C. |
| 2 | CCP-3OCF3 | 3.0 | $T(S, N) <$ | −40° C. |
| 3 | CCP-2F.F.F | 10.0 | $n_e$ (20° C., | 1.5546 |
| 4 | CCP-3F.F.F | 4.0 | 589.3 nm) = | |
| 5 | CCZU-2-F | 4.0 | $\Delta n$ (20° C., | 0.0808 |
| 6 | CCZU-3-F | 13.0 | 589.3 nm) = | |
| 7 | CGZP-2-OT | 4.0 | $\epsilon_\parallel$ (20° C., | 10.7 |
| 8 | CC-5-V | 16.0 | 1 kHz) = | |
| 9 | CC-3-V1 | 11.0 | $\Delta\epsilon$ (20° C., | 7.2 |
| 10 | CCG-V-F | 5.0 | 1 kHz) = | |
| 11 | PGU-2-F | 7.0 | $\gamma_1$ (20° C.) = | 91 mPa·s |
| 12 | CCH-3CF3 | 3.0 | $d \cdot \Delta n =$ | 0.50 μm |
| 13 | CCH-35 | 4.0 | $V_{10}$ (20° C.) = | 1.66 V |
| 14 | CCP-2OCF3.F | 4.0 | | |
| 15 | CCP-3OCF3.F | 4.0 | | |
| 16 | CCP-5OCF3.F | 2.0 | | |
| 17 | CCP-V-1 | 2.0 | | |
| Σ | | 100.0 | | |

This mixture has a very favourable value of $\Delta n$ and an extremely good combination of the clearing point and rotational viscosity $(T(N,I)/\gamma_1)$, which leads to outstanding response times. In particular it has a low rotational viscosity and an excellent phase range.

Example 3

A liquid crystal mixture is realised with the composition and properties given in the following table.

| | Composition Compound | | | |
|---|---|---|---|---|
| No. | Abbreviation | Conc./% | Physical Properties | |
| 1 | CCP-2OCF3 | 5.0 | $T(N, I) =$ | 82.1° C. |
| 2 | CCP-3OCF3 | 4.0 | $\gamma_1$ (20° C.) = | 93 mPa·s |
| 3 | CCP-2F.F.F | 10.0 | $d \cdot \Delta n =$ | 0.50 μm |
| 4 | CCP-3F.F.F | 4.0 | $V_{10}$ (20° C.) = | 1.62 V |
| 5 | CCZU-2-F | 4.0 | | |
| 6 | CCZU-3-F | 10.0 | | |
| 7 | CGZP-2-OT | 7.5 | | |
| 8 | CC-5-V | 13.0 | | |
| 9 | CC-3-V1 | 13.0 | | |
| 10 | CCG-V-F | 7.0 | | |
| 11 | PGU-2-F | 5.5 | | |
| 12 | CCH-3CF3 | 5.0 | | |
| 13 | CCH-35 | 2.0 | | |
| 14 | CCP-2OCF3.F | 3.0 | | |
| 15 | CCP-3OCF3.F | 3.0 | | |
| 16 | CCP-5OCF3.F | 4.0 | | |
| Σ | | 100.0 | | |

This mixture has a very favourable value of $\Delta n$ and an extremely good combination of the clearing point and rotational viscosity $(T(N,I)/\gamma_1)$, which leads to outstanding response times.

Example 4

A liquid crystal mixture is realised with the composition and properties given in the following table.

| | Composition Compound | | | |
|---|---|---|---|---|
| No. | Abbreviation | Conc./% | Physical Properties | |
| 1 | CCP-2OCF3 | 5.0 | $T(N, I) =$ | 81° C. |
| 2 | CCP-3OCF3 | 5.0 | $T(S, N) <$ | −30° C. |
| 3 | CCP-2F.F.F | 10.5 | $n_e$ (20° C., | 1.5549 |
| 4 | CCP-3F.F.F | 5.0 | 589.3 nm) = | |
| 5 | CCZU-2-F | 4.0 | $\Delta n$ (20° C., | 0.0800 |
| 6 | CCZU-3-F | 10.0 | 589.3 nm) = | |

-continued

| No. | Abbreviation | Conc./% | Physical Properties | | |
|---|---|---|---|---|---|
| 7 | CGZP-2-OT | 5.0 | $\epsilon_\parallel$ (20° C., 1 kHz) = | 10.2 | |
| 8 | CC-5-V | 15.0 | $\Delta\epsilon$ (20° C., | 6.8 | |
| 9 | CC-3-V1 | 15.0 | 1 kHz) = | | |
| 10 | CCH-35 | 3.0 | $\gamma_1$ (20° C.) = | 82 | mPa·s |
| 11 | CCG-V-F | 10.0 | d · $\Delta$n = | 0.50 | μm |
| 12 | PGU-2-F | 6.5 | $V_{10}$ (20° C.) = | 1.68 | V |
| 13 | CCP-20CF3.F | 3.0 | | | |
| 14 | CCH-3CF3 | 3.0 | | | |
| Σ | | 100.0 | | | |

This mixture has a very favourable value of Δn and an extremely good combination of the clearing point and rotational viscosity (T(N,I)/$\gamma_1$), which leads to outstanding response times.

Example 5

A liquid crystal mixture is realised with the composition and properties given in the following table.

| No. | Abbreviation | Conc./% | Physical Properties | | |
|---|---|---|---|---|---|
| 1 | CCP-2F.F.F | 11.0 | T(N, I) = | 78° | C. |
| 2 | CCZU-2-F | 3.0 | $n_e$ (20° C., | 1.5529 | |
| 3 | CCZU-3-F | 13.0 | 589.3 nm) = | | |
| 4 | CCP-20CF3 | 5.5 | Δn (20° C., | 0.0779 | |
| 5 | CCP-30CF3 | 2.5 | 589.3 nm) = | | |
| 6 | CCP-20CF3.F | 1.5 | $\epsilon_\parallel$ (20° C., 1 kHz) = | 9.5 | |
| 7 | CC-3-V | 14.0 | $\Delta\epsilon$ (20° C., | 6.2 | |
| 8 | CC-3-V1 | 13.0 | 1 kHz) = | | |
| 9 | CC-5-V | 12.0 | $\gamma_1$ (20° C.) = | 71 | mPa·s |
| 10 | CCH-35 | 2.0 | d · Δn = | 0.50 | μm |
| 11 | CGZP-2-OT | 7.5 | $V_{10}$ (20° C.) = | 1.71 | V |
| 12 | PGU-2-F | 7.0 | | | |
| 13 | CCG-V-F | 3.0 | | | |
| 14 | CCOC-3-3 | 1.5 | | | |
| 15 | CCP-V-1 | 1.5 | | | |
| 16 | CCH-3CF3 | 2.0 | | | |
| Σ | | 100.0 | | | |

This mixture has a very favourable value of Δn and an extremely good combination of the clearing point and rotational viscosity (T(N,I)/$\gamma_1$), which leads to outstanding response times. In particular it has an extremely low rotational viscosity.

Example 6

A liquid crystal mixture is realised with the composition and properties given in the following table.

| No. | Abbreviation | Conc./% | Physical Properties | | |
|---|---|---|---|---|---|
| 1 | CCH-35 | 1.5 | T(N, I) = | 70° | C. |
| 2 | CCP-20CF3 | 6.0 | $n_e$ (20° C., | 1.5637 | |
| 3 | CCP-30CF3 | 4.0 | 589.3 nm) = | | |
| 4 | CCP-20CF3.F | 9.5 | Δn (20° C., | 0.0873 | |
| 5 | CCP-2F.F.F | 11.5 | 589.3 nm) = | | |
| 6 | CGU-2-F | 11.0 | $\epsilon_\parallel$ (20° C., 1 kHz) = | 15.7 | |
| 7 | CCZU-2-F | 4.0 | $\Delta\epsilon$ (20° C., | 11.1 | |
| 8 | CCZU-3-F | 15.0 | 1 kHz) = | | |
| 9 | CCZU-5-F | 5.0 | $\gamma_1$ (20° C.) = | 124 | mPa·s |
| 10 | PGU-2-F | 8.0 | d · Δn = | 0.50 | μm |
| 11 | CGZP-2-OT | 10.0 | $V_{10}$ (20° C.) = | 1.11 | V |
| 12 | CCH-3CF3 | 5.0 | | | |
| 13 | CC-3-V | 7.0 | | | |
| 16 | CCOC-3-3 | 2.5 | | | |
| Σ | | 100.0 | | | |

This mixture has a favourable value of Δn and a good combination of the clearing point and rotational viscosity (T(N,I)/$\gamma_1$), which leads to good response times. It further has a high value of Δ∈ and is suited for operation with low voltage.

Example 7

A liquid crystal mixture is realised with the composition and properties given in the following table.

| No. | Abbreviation | Conc./% | Physical Properties | | |
|---|---|---|---|---|---|
| 1 | CCH-35 | 4.0 | T(N, I) = | 71.5° | C. |
| 2 | CCP-20CF3 | 6.0 | T(S, N) < | −30° | C. |
| 3 | CCP-30CF3 | 7.0 | $n_e$ (20° C., | 1.5606 | |
| 4 | CCP-40CF3 | 4.0 | 589.3 nm) = | | |
| 5 | CCP-2F.F.F | 10.0 | Δn (20° C., | 0.0864 | |
| 6 | CCP-20CF3.F | 5.5 | 589.3 nm) = | | |
| 7 | CGU-2-F | 11.0 | $\gamma_1$ (20° C.) = | 131 | mPa·s |
| 8 | CCZU-2-F | 5.0 | d · Δn = | 0.50 | μm |
| 9 | CCZU-3-F | 15.0 | $V_{10}$ (20° C.) = | 1.17 | V |
| 10 | CCZU-5-F | 5.0 | $V_{50}$ (20° C.) = | 1.41 | V |
| 11 | CC-5-V | 3.0 | $V_{90}$ (20° C.) = | 1.78 | V |
| 12 | PGU-2-F | 6.5 | | | |
| 13 | CGZP-2-OT | 10.0 | | | |
| 14 | CCH-3CF3 | 8.0 | | | |
| Σ | | 100.0 | | | |

This mixture has a favourable value of Δn and a good combination of the clearing point and rotational viscosity (T(N,I)/$\gamma_1$), which leads to good response times. It further has a high value of Δ∈ and is suited for operation with low voltage.

Example 8

A liquid crystal mixture is realised with the composition and properties given in the following table.

Composition

| No. | Compound Abbreviation | Conc./% | Physical Properties | |
|---|---|---|---|---|
| 1 | CCH-35 | 5.0 | $T(N, I) =$ | 70° C. |
| 2 | CCH-3CF3 | 8.0 | $T(S, N) <$ | −40° C. |
| 3 | CCP-20CF3 | 8.0 | $n_e$ (20° C., | 1.5602 |
| 4 | CCP-30CF3 | 8.0 | 589.3 nm) = | |
| 5 | CCP-2F.F.F | 11.0 | $\Delta n$ (20° C., | 0.0863 |
| 6 | CCP-20CF3.F | 7.0 | 589.3 nm) = | |
| 7 | CGU-2-F | 11.0 | $\gamma_1$ (20° C.) = | 133 mPa·s |
| 8 | CCZU-2-F | 5.0 | $d \cdot \Delta n =$ | 0.50 μm |
| 9 | CCZU-3-F | 15.0 | $V_{10}$ (20° C.) = | 1.13 V |
| 10 | CCZU-5-F | 5.0 | $V_{50}$ (20° C.) = | 1.37 V |
| 11 | PGU-2-F | 7.0 | $V_{90}$ (20° C.) = | 1.74 V |
| 12 | CGZP-2-OT | 10.0 | | |
| Σ | | 100.0 | | |

This mixture has a favourable value of Δn and a good combination of the clearing point and rotational viscosity $(T(N,I)/\gamma_1)$, which leads to good response times. It further has a high value of Δ∈ and is suited for operation with low voltage.

Example 9

A liquid crystal mixture is realised with the composition and properties given in the following table.

Composition

| No. | Compound Abbreviation | Conc./% | Physical Properties | |
|---|---|---|---|---|
| 1 | CCH-35 | 5.0 | $T(N, I) =$ | 70° C. |
| 2 | CCH-3CF3 | 8.0 | $T(S, N) <$ | −40° C. |
| 3 | CCP-20CF3 | 8.0 | $n_e$ (20° C., | 1.5635 |
| 4 | CCP-30CF3 | 8.0 | 589.3 nm) = | |
| 5 | CCP-2F.F.F | 10.0 | $\Delta n$ (20° C., | 0.0885 |
| 6 | CCP-20CF3.F | 7.0 | 589.3 nm) = | |
| 7 | CGU-2-F | 11.0 | $\gamma_1$ (20° C.) = | 125 mPa·s |
| 8 | CCZU-2-F | 5.0 | $d \cdot \Delta n =$ | 0.50 μm |
| 9 | CCZU-3-F | 15.0 | $V_{10}$ (20° C.) = | 1.13 V |
| 10 | CCZU-5-F | 5.0 | $V_{50}$ (20° C.) = | 1.37 V |
| 11 | PGU-2-F | 8.0 | $V_{90}$ (20° C.) = | 1.73 V |
| 12 | CGZP-2-OT | 10.0 | | |
| Σ | | 100.0 | | |

This mixture has a favourable value of Δn and a good combination of the clearing point and rotational viscosity $(T(N,I)/\gamma_1)$, which leads to good response times. It further has a high value of Δ∈ and is suited for operation with low voltage.

Example 10

A liquid crystal mixture is realised with the composition and properties given in the following table.

Composition

| No. | Compound Abbreviation | Conc./% | Physical Properties | |
|---|---|---|---|---|
| 1 | CC-3-V | 4.0 | $T(N, I) =$ | 70.5° C. |
| 2 | CCH-3CF3 | 8.0 | $T(S, N) <$ | −30° C. |
| 3 | CCP-20CF3 | 5.0 | $\Delta n$ (20° C., | 0.0885 |
| 4 | CCP-20CF3.F | 12.0 | 589.3 nm) = | |
| 5 | CCP-2F.F.F | 11.0 | $\gamma_1$ (20° C.) = | 131 mPa·s |
| 6 | CGU-2-F | 11.0 | $d \cdot \Delta n =$ | 0.50 μm |
| 7 | PGU-2-F | 4.0 | $V_{10}$ (20° C.) = | 1.03 V |
| 8 | CCZU-2-F | 5.0 | | |
| 9 | CCZU-3-F | 15.0 | | |
| 10 | CCZU-5-F | 5.0 | | |
| 11 | CGZP-2-OT | 11.0 | | |
| 12 | CGZP-3-OT | 9.0 | | |
| Σ | | 100.0 | | |

This mixture has a favourable value of Δn and a good combination of the clearing point and rotational viscosity $(T(N,I)/\gamma_1)$.

Example 11

A liquid crystal mixture is realised with the composition and properties given in the following table.

Composition

| No. | Compound Abbreviation | Conc./% | Physical Properties | |
|---|---|---|---|---|
| 1 | CCP-2F.F.F | 10.0 | $T(N, I) =$ | 70.1° C. |
| 2 | CCP-20CF3 | 1.0 | $T(S, N) <$ | −30° C. |
| 3 | CGZP-2-OT | 15.0 | $\Delta n$ (20° C., | 0.1021 |
| 4 | CGZP-3-OT | 11.0 | 589.3 nm) = | |
| 5 | CCZU-2-F | 5.0 | $\gamma_1$ (20° C.) = | 110 mPa·s |
| 6 | CCZU-3-F | 15.0 | $d \cdot \Delta n =$ | 0.50 μm |
| 7 | CCZU-5-F | 3.0 | $V_{10}$ (20° C.) = | 1.02 V |
| 8 | PGU-2-F | 9.0 | | |
| 9 | PGU-3-F | 9.0 | | |
| 10 | CC-3-V | 15.0 | | |
| 11 | CCH-3CF3 | 7.0 | | |
| Σ | | 100.0 | | |

This mixture has a favourably high of Δn and a high value of Δ∈ and compares favourably with the mixture of the following comparative example, comparative example 2.

Comparative Example 2

A liquid crystal mixture is realised according to example E of WO 01/79379. This mixture has the composition and properties given in the following table.

| Composition Compound | | | | | |
|---|---|---|---|---|---|
| No. | Abbreviation | Conc./% | Physical Properties | | |
| 1 | CCP-2F.F.F | 10.0 | T(N, I) = | | 69.5° C. |
| 2 | CCP-2OCF3 | 4.0 | T(S, N) < | | 40° C. |
| 3 | CGZP-2-OT | 14.0 | $\Delta n$ (20° C., | | 0.1052 |
| 4 | CGZP-3-OT | 10.0 | 589.3 nm) = | | |
| 5 | CCZU-2-F | 4.0 | $\gamma_1$ (20° C.) = | | 132 mPa·s |
| 6 | CCZU-3-F | 15.0 | d · $\Delta n$ = | | 0.50 µm |
| 7 | CCZU-5-F | 3.0 | $V_{10}$ (20° C.) = | | 0.98 V |
| 8 | CGU-2-F | 10.0 | $V_{50}$ (20° C.) = | | 1.20 V |
| 9 | CGU-3-F | 5.9 | $V_{90}$ (20° C.) = | | 1.50 V |
| 10 | PGU-2-F | 9.0 | | | |
| 11 | PGU-3-F | 9.0 | | | |
| 12 | CC-3-V | 11.0 | | | |
| Σ | | 100.0 | | | |

This mixture, which is not using a compound of formula II according to the present application, has values for the clearing point, $\Delta n$ and $\Delta\varepsilon$ which are similar to those of example 11, but it has a significantly larger rotational viscosity.

Example 12

A liquid crystal mixture is realised with the composition and properties given in the following table.

| Composition Compound | | | | | |
|---|---|---|---|---|---|
| No. | Abbreviation | Conc./% | Physical Properties | | |
| 1 | CCH-35 | 1.5 | T(N, I) = | | 70° C. |
| 2 | CCP-2OCF3 | 6.0 | T(S, N) < | | −40° C. |
| 3 | CCP-3OCF3 | 4.0 | $\varepsilon_\parallel$ (20° C., | | 15.9 |
| 4 | CCP-2OCF3.F | 9.5 | 1 kHz) = | | |
| 5 | CCP-2F.F.F | 11.5 | $\Delta\varepsilon$ (20° C., | | 11.1 |
| 6 | CGU-2-F | 11.0 | 1 kHz) = | | |
| 7 | CCZU-2-F | 4.0 | $n_e$ (20° C., | | 1.5642 |
| 8 | CCZU-3-F | 15.0 | 589.3 nm) = | | |
| 9 | CCZU-5-F | 5.0 | $\Delta n$ (20° C., | | 0.0875 |
| 10 | PGU-2-F | 8.0 | 589.3 nm) = | | |
| 11 | CGZP-2-OT | 10.0 | $\gamma_1$ (20° C.) = | | 124 mPa·s |
| 12 | CCH-3CF3 | 5.0 | d · $\Delta n$ = | | 0.50 µm |
| 13 | CC-3-V | 7.0 | $V_{10}$ (20° C.) = | | 1.09 V |
| 14 | CCOC-3-3 | 2.5 | $V_{50}$ (20° C.) = | | 1.33 V |
| Σ | | 100.0 | $V_{90}$ (20° C.) = | | 1.65 V |

This mixture has a favourably high of $\Delta n$ and a high value of $\Delta\varepsilon$ and compares favourably with the mixture of the following comparative example, comparative example 2.

Example 13

A liquid crystal mixture is realised with the composition and properties given in the following table.

| Composition Compound | | | | | |
|---|---|---|---|---|---|
| No. | Abbreviation | Conc./% | Physical Properties | | |
| 1 | CCP-2OCF3 | 5.0 | T(N, I) = | | 75° C. |
| 2 | CCP-3OCF3 | 5.0 | $n_e$ (20° C., | | 1.5538 |
| 3 | CCP-2F.F.F | 9.0 | 589.3 nm) = | | |
| 4 | CCP-3F.F.F | 5.0 | $\Delta n$ (20° C., | | 0.0802 |
| 5 | CCZU-2-F | 3.0 | 589.3 nm) = | | |
| 6 | CCZU-3-F | 12.0 | $\varepsilon_\parallel$ (20° C., 1 kHz) = | | 10.7 |
| 7 | CGZP-2-OT | 7.0 | $\Delta\varepsilon$ (20° C., 1 kHz) = | | 7.2 |
| 8 | CC-5-V | 19.0 | $\gamma_1$ (20° C.) = | | 79 mPa·s |
| 9 | CC-3-V1 | 9.0 | d · $\Delta n$ = | | 0.50 µm |
| 10 | CCG-V-F | 8.0 | $V_{10}$ (20° C.) = | | 1.45 V |
| 11 | PGU-2-F | 8.0 | $V_{50}$ (20° C.) = | | 1.82 V |
| 12 | CCH-3CF3 | 7.0 | $V_{90}$ (20° C.) = | | 2.25 V |
| 13 | CCH-35 | 3.0 | | | |
| Σ | | 100.0 | | | |

This mixture has a favourably high of $\Delta n$ and a high value of $\Delta\varepsilon$ and compares favourably with the mixture of the following comparative example, comparative example 2.

Example 14

A liquid crystal mixture is realised with the composition and properties given in the following table.

| Composition Compound | | | | | |
|---|---|---|---|---|---|
| No. | Abbreviation | Conc./% | Physical Properties | | |
| 1 | PGU-2-F | 8.0 | T(N, I) = | | 70.5° C. |
| 2 | CGU-2-F | 10.0 | T(S, N) < | | −40° C. |
| 3 | CGZP-2-OT | 11.0 | $n_e$ (20° C., | | 1.5669 |
| 4 | CCP-2F.F.F | 10.0 | 589.3 nm) = | | |
| 5 | CCZU-2-F | 4.0 | $\Delta n$ (20° C., | | 0.0865 |
| 6 | CCZU-3-F | 9.0 | 589.3 nm) = | | |
| 7 | CCH-35 | 4.0 | d · $\Delta n$ = | | 0.50 µm |
| 8 | CC-5-V | 18.0 | $V_{10}$ (20° C.) = | | 1.46 V |
| 9 | CC-3-V1 | 10.0 | $V_{50}$ (20° C.) = | | 1.75 V |
| 10 | CCH-3CF3 | 6.0 | $V_{90}$ (20° C.) = | | 2.17 V |
| 11 | CCP-V-1 | 10.0 | | | |
| Σ | | 100.0 | | | |

This mixture has a favourably high of $\Delta n$ and a high value of $\Delta\varepsilon$ and compares favourably with the mixture of the following comparative example, comparative example 2.

Example 15

A liquid crystal mixture is realised with the composition and properties given in the following table.

| Composition Compound | | | Physical Properties | |
|---|---|---|---|---|
| No. | Abbreviation | Conc./% | | |
| 1 | PGU-2-F | 9.0 | $T(N, I)$ = | 70° C. |
| 2 | CGU-2-F | 10.0 | $n_e$ (20° C., | 1.5685 |
| 3 | CGZP-2-OT | 11.0 | 589.3 nm) = | |
| 4 | CCP-2F.F.F | 10.0 | $\Delta n$ (20° C., | 0.0876 |
| 5 | CCZU-2-F | 4.0 | 589.3 nm) = | |
| 6 | CCZU-3-F | 9.0 | $\gamma_1$ (20° C.) = | 77 mPa · s |
| 7 | CCH-35 | 4.0 | $d \cdot \Delta n$ = | 0.50 μm |
| 8 | CC-5-V | 18.0 | $V_{10}$ (20° C.) = | 1.44 V |
| 9 | CC-3-V1 | 9.0 | $V_{50}$ (20° C.) = | 1.72 V |
| 10 | CCH-3CF3 | 6.0 | $V_{90}$ (20° C.) = | 2.12 V |
| 11 | CCP-V-1 | 10.0 | | |
| Σ | | 100.0 | | |

This mixture has a favourably high of $\Delta n$ and a high value of $\Delta \varepsilon$ and compares favourably with the mixture of the following comparative example, comparative example 2.

Example 16

A liquid crystal mixture is realised with the composition and properties given in the following table.

| Composition Compound | | | Physical Properties | |
|---|---|---|---|---|
| No. | Abbreviation | Conc./% | | |
| 1 | CC-5-V | 20.0 | $T(N, I)$ = | 69.5° C. |
| 2 | CC-3-V1 | 10.0 | $n_e$ (20° C., | 1.5624 |
| 3 | CCH-35 | 4.0 | 589.3 nm) = | |
| 4 | PCH-53 | 5.5 | $\Delta n$ (20° C., | 0.0872 |
| 5 | CCH-3CF3 | 7.0 | 589.3 nm) = | |
| 6 | CGU-2-F | 3.5 | $d \cdot \Delta n$ = | 0.50 μm |
| 7 | PGU-2-F | 8.0 | $V_{10}$ (20° C.) = | 1.50 V |
| 8 | PGU-3-F | 1.5 | $V_{50}$ (20° C.) = | 1.79 V |
| 9 | CCZU-2-F | 4.0 | $V_{90}$ (20° C.) = | 2.19 V |
| 10 | CCZU-3-F | 14.0 | | |
| 11 | CGZP-2-OT | 11.0 | | |
| 12 | CGZP-3-OT | 8.0 | | |
| 13 | CCP-30CF3 | 3.5 | | |
| Σ | | 100.0 | | |

This mixture has a favourably high of $\Delta n$ and a high value of $\Delta \varepsilon$ and compares favourably with the mixture of the following comparative example, comparative example 2.

The invention claimed is:

1. A liquid crystal medium, comprising a dielectrically positive component A, which comprises one or more compounds of formula I

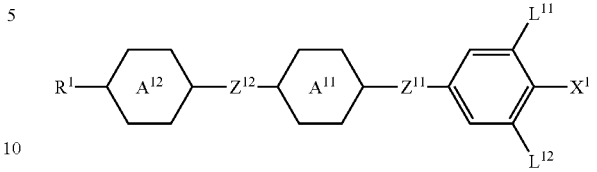

and
one or more compounds of formula II

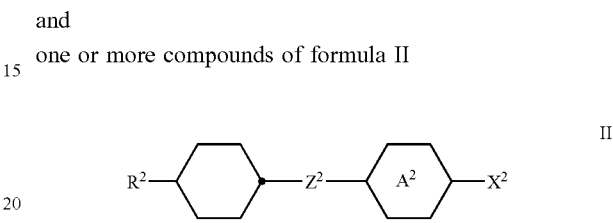

wherein
$R^1$ and $R^2$ are, each independently, alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms, $X^1$ is F, Cl or fluorinated alkyl or fluorinated alkoxy, each with 1 to 4 C-atoms,

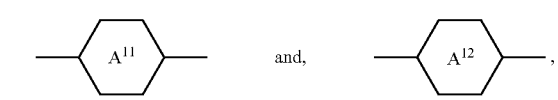

independently of each other, are

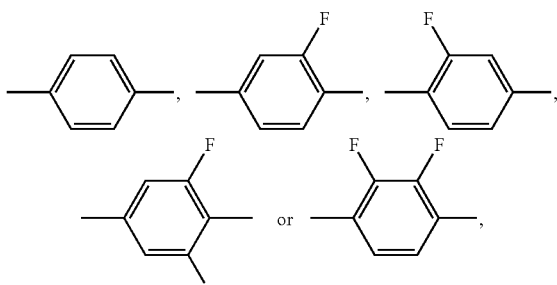

$Z^{11}$ and $Z^{12}$ are each a single bond,
$L^{11}$ is F,
$L^{12}$ is H or F,

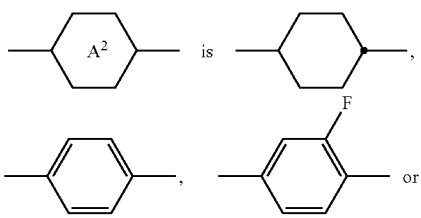

-continued

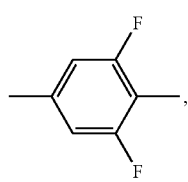

$Z^2$ is —$CH_2$—$CH_2$—, —$CF_2$—$CF_2$—, —$CF_2$—O—, —O—$CF_2$—, —$CH_2$—O—, —O—$CH_2$—, —CO—O— or a single bond, and $X^2$ is F, Cl or fluorinated alkyl or fluorinated alkoxy each with 1 to 4 C-atoms, wherein a compound of formula II-1d is present in the medium

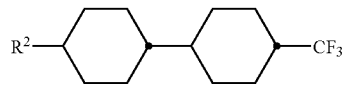
II-1d wherein $R^2$ is as defined above, and at a concentration of 29.5% or more of one or more compounds of formula III

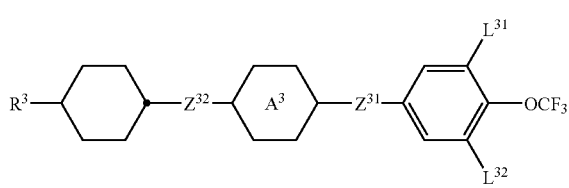
III wherein $R^3$ is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,

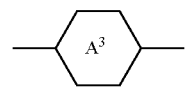

is

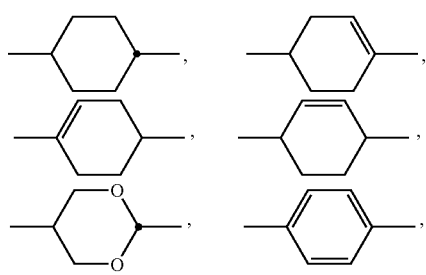

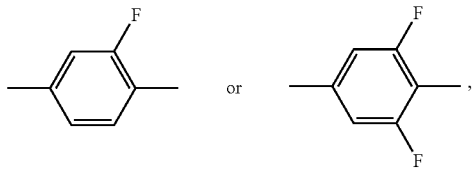

$Z^{31}$ and $Z^{32}$ are, independently of each other, —$CH_2$—$CH_2$—, —$CF_2$—$CF_2$—, —$CF_2$—O—, —O—$CF_2$, —$CH_2$—O—, —O—$OH_2$—, —CO—O— or a single bond, and $L^{31}$ and $L^{32}$ are, independently of each other, H or F.

2. A liquid crystal medium according to claim 1, wherein component A further comprises one or more compounds of formula IV

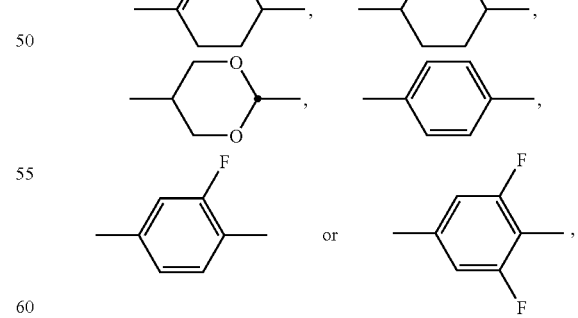
IV wherein $R^4$ is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms, $A^{41}$ is $Z^{41}$ and $Z^{42}$ are, independently of each other, —$CH_2$—$CH_2$—, —$CF_2$—$CF_2$—, —$CF_2$—O—, —O—$CF_2$—, —$CH_2$—O—, —O—$CH_2$—, —CO—O— or a single bond, and $L^{41}$ and $L^{42}$ are, independently of each other, H or F.

3. A liquid crystal medium according to claim 1, further comprising a dielectrically neutral component B, which comprises one or more compounds of formula V

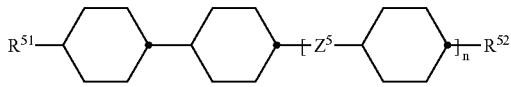
V wherein
$R^{51}$ and $R^{52}$, independently of each other, are alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms, $Z^5$ is —$CH_2$—$CH_2$—, —$CF_2$—$CF_2$—, —$CF_2$—O—, —O—$CF_2$—, —$CH_2$—O—, —O—$CH_2$—, —CO—O—, —CH=CH—, CF=CF—, —CF=CH—, —CH=CF— or a single bond, and n is 0 or 1.

4. A liquid crystal medium according to claim 1, further comprising a dielectrically negative component C.

5. A liquid crystal medium according to claim 1, wherein one or more compounds of formula I are of formulae I-1 to I-3

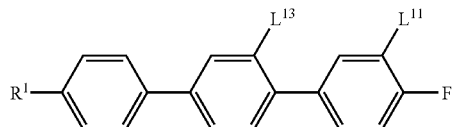
I-1

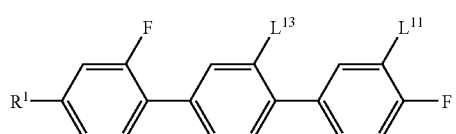
I-2

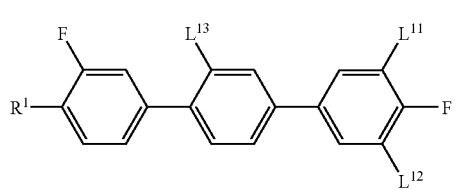
I-3 wherein
$R^1$, $L^{11}$ and $L^{12}$ have the meanings given in claim 1, and $L^{13}$ is H or F.

6. A liquid crystal medium according to claim 1, wherein one or more compounds of formula II are of formulae II-1 and II-2

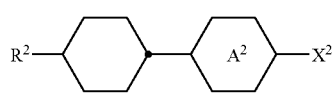
II-1

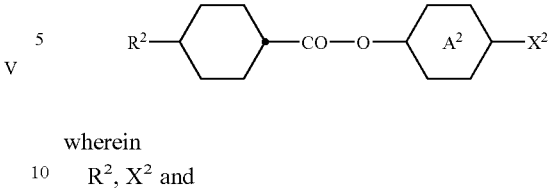
II-2 wherein
$R^2$, $X^2$ and

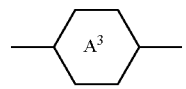

have the meanings given in claim 1.

7. A liquid crystal display comprising a liquid crystal medium according to claim 1.

8. A liquid crystal display according to claim 7, which is addressed by an active matrix.

9. A liquid crystal medium according to claim 2, further comprising a dielectrically neutral component B, which comprises one or more compounds of formula V

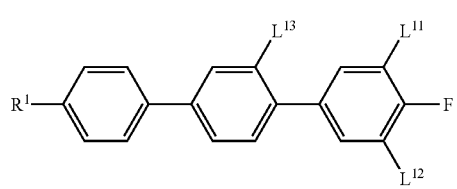
V wherein
$R^{51}$ and $R^{52}$, independently of each other, are alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms, $Z^5$ is —$CH_2$—$CH_2$—, —$CF_2$—$CF_2$—, —$CF_2$—O—, —O—$CF_2$—, —$CH_2$—O—, —O—$CH_2$—, —CO—O—, —CH=CH—, CF=CF—, —CF=CH—, —CH=CF— or a single bond, and n is 0 or 1.

10. A liquid crystal medium according to claim 2, wherein one or more compounds of formula I are of formulae I-1 to I-3

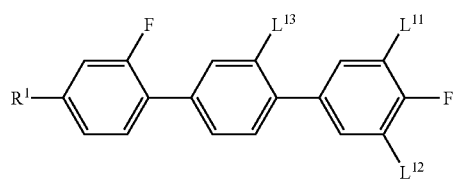
I-1

I-2

-continued

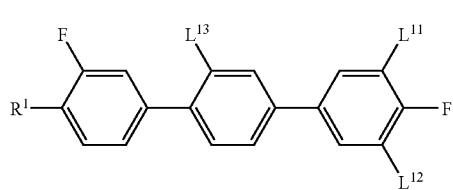

I-3 wherein
$R^1$, $L^{11}$ and $L^{12}$ have the meanings given in claim 2, and $L^{13}$ is H or F.

11. A liquid crystal medium according to claim 2, wherein one or more compounds of formula II are of formulae II-1 and II-2

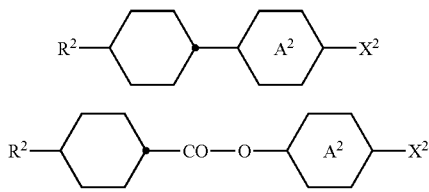

II-1

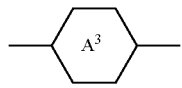

II-2 wherein
$R^2$, $X^2$ and

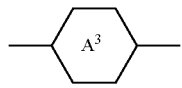

have the meanings given in claim 2.

12. A liquid crystal medium according to claim 3, wherein one or more compounds of formula I are of formulae I-1 to I-3

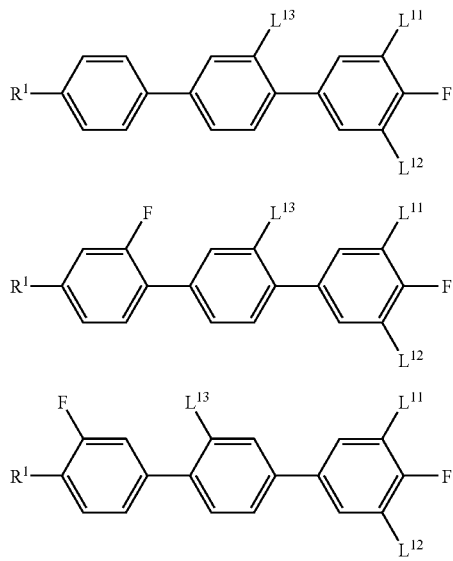

I-1

I-2

I-3 wherein
$R^1$, $L^{11}$ and $L^{12}$ have the meanings given in claim 3, and $L^{13}$ is H or F.

13. A liquid crystal medium according to claim 3, wherein one or more compounds of formula II are of formulae II-1 and II-2

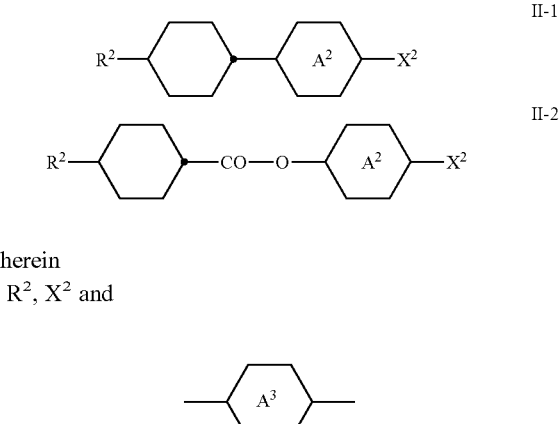

II-1

II-2 wherein
$R^2$, $X^2$ and

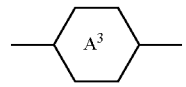

have the meanings given in claim 3.

14. A liquid crystal medium according to claim 5, wherein $L^{13}$ is F.

15. A liquid crystal medium according to claim 1, comprising a compound of formula I-1

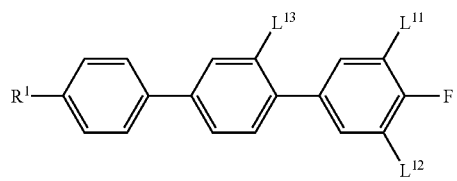

I-1 wherein
$R^1$ is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms,
$L^{11}$ and $L^{13}$ is F, and
$L^{12}$ is H or F.

16. A liquid crystal medium according to claim 15, comprising a compound of formula I-1d

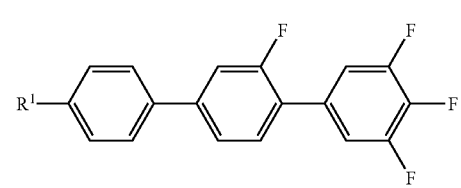

I-1d wherein
$R^1$ is alkyl, alkoxy, fluorinated alkyl or fluorinated alkoxy with 1 to 7 C-atoms, or alkenyl, alkenyloxy, alkoxyalkyl or fluorinated alkenyl with 2 to 7 C-atoms.

17. A liquid crystal medium according to claim 1, wherein the one or more compounds of formula III are present at a concentration of 29.5%–45%.

18. A liquid crystal medium according to claim 1, wherein the one or more compounds of formula III are present at a concentration of 33%–45%.

19. A liquid crystal medium according to claim 1, wherein the one or more compounds of formula III are present at a concentration of 33–37%.

* * * * *

UNITED STATES PATENT AND TRADEMARK OFFICE
CERTIFICATE OF CORRECTION

PATENT NO. : 7,153,550 B2
APPLICATION NO. : 10/503476
DATED : December 26, 2006
INVENTOR(S) : Michael Heckmeier It is certified that error appears in the above-identified patent and that said Letters Patent is hereby corrected as shown below:

Column 52, line 13 reads "$OH^2$" should read -- $CH^2$ --

Column 54, line 15 reads " 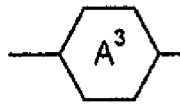 " should read -- 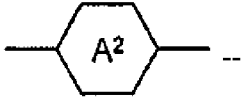 --

Column 55, line 35 reads " 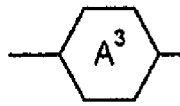 " should read -- 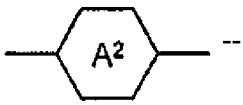 --

Column 56, line 25 reads " 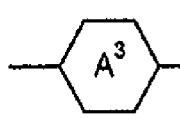 " should read -- 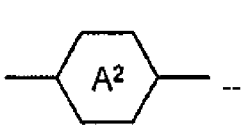 --

Signed and Sealed this

Eighth Day of May, 2007

JON W. DUDAS
*Director of the United States Patent and Trademark Office*